(12) United States Patent
Stewart et al.

(10) Patent No.: US 11,333,181 B2
(45) Date of Patent: May 17, 2022

(54) STIFFENING SYSTEM FOR HANGER ASSEMBLY

(71) Applicant: Anvil International, LLC, Exeter, NH (US)

(72) Inventors: Jebediah Stewart, Portsmouth, NY (US); Jordan Cameron Belen, West Warwick, RI (US); Bobby Budziszek, Middletown, RI (US)

(73) Assignee: ASC Engineered Solutions, LLC, Exeter, NH (US)

( * ) Notice: Subject to any disclaimer, the term of this patent is extended or adjusted under 35 U.S.C. 154(b) by 0 days.

(21) Appl. No.: 16/924,277

(22) Filed: Jul. 9, 2020

(65) Prior Publication Data

US 2022/0010892 A1   Jan. 13, 2022

(51) Int. Cl.
| | | |
|---|---|---|
| *F16B 7/04* | (2006.01) | |
| *F16L 3/133* | (2006.01) | |
| *F16L 3/127* | (2006.01) | |
| *F16L 3/12* | (2006.01) | |

(52) U.S. Cl.
CPC ............ *F16B 7/0433* (2013.01); *F16L 3/127* (2013.01); *F16L 3/1218* (2013.01); *F16L 3/133* (2013.01)

(58) Field of Classification Search
CPC . F16L 3/11; F16L 3/1218; F16L 3/127; F16L 3/133; F16L 3/20; F16B 7/0433
See application file for complete search history.

(56) References Cited

U.S. PATENT DOCUMENTS

| | | |
|---|---|---|
| 2,875,969 A | 3/1959 | Thompson |
| 2,901,199 A | 8/1959 | Thompson |
| 3,036,801 A | 5/1962 | Cemashko |
| 3,539,137 A * | 11/1970 | March ................... F16L 59/135 248/62 |
| 4,666,116 A | 5/1987 | Lloyd |
| 4,947,607 A | 8/1990 | Stein |
| 5,344,108 A * | 9/1994 | Heath ....................... F16L 3/14 248/300 |
| 5,474,268 A * | 12/1995 | Yu ........................... A01G 17/08 248/61 |
| 6,417,449 B1 * | 7/2002 | Perez-Bonifacini ........................ F16B 7/0433 174/54 |
| 6,454,232 B1 | 9/2002 | Roth |

(Continued)

FOREIGN PATENT DOCUMENTS

| | | | | |
|---|---|---|---|---|
| DE | 2504222 A | * | 8/1976 | |
| EP | 3702652 A1 | * | 9/2020 | ............ F16L 3/1025 |

(Continued)

*Primary Examiner* — Eret C McNichols
(74) *Attorney, Agent, or Firm* — Taylor English Duma LLP

(57) ABSTRACT

Example aspects of a stiffening system for a hanger assembly, a hanger assembly, and method of reinforcing a hanger assembly are disclosed. The stiffening system for a hanger assembly can comprise a stiffener rod; a brace member oriented parallel to the stiffener rod; a stiffening connector coupling the brace member to the stiffener rod, the stiffening connector defining a connector hook and a fastener hole, the connector hook defining a hook recess, a portion of the brace member received in the hook recess; and a connector fastener extending through the fastener hole, the connector fastener pressing the stiffener rod into a corner region defined between the brace member and the stiffening connector.

13 Claims, 19 Drawing Sheets

(56) References Cited

U.S. PATENT DOCUMENTS

| | | | |
|---|---|---|---|
| 6,783,104 B1 | 8/2004 | Roth | |
| 6,991,198 B1 | 1/2006 | Roth | |
| 7,048,267 B2 | 5/2006 | Bries | |
| 7,162,837 B1 * | 1/2007 | Roth | E04B 9/20 |
| | | | 52/120 |
| 7,188,809 B1 | 3/2007 | Roth | |
| 7,343,831 B1 * | 3/2008 | Tamcsin | F16B 7/0433 |
| | | | 74/551.1 |
| 7,819,364 B2 | 10/2010 | Duggan | |
| 8,820,690 B2 | 9/2014 | Weber | |
| 9,441,656 B2 | 9/2016 | Duggan | |
| 9,986,838 B1 | 6/2018 | Biggs | |
| 10,087,967 B2 | 10/2018 | Duggan | |
| 10,281,062 B2 | 5/2019 | Roth | |
| 10,378,680 B2 | 8/2019 | Anderson | |
| 10,975,900 B1 * | 4/2021 | Roth | F16M 13/022 |
| 2003/0136883 A1 * | 7/2003 | Sjoblom | G01F 15/18 |
| | | | 248/58 |
| 2005/0217186 A1 * | 10/2005 | Bartmas | B25C 7/00 |
| | | | 52/90.1 |
| 2006/0180713 A1 * | 8/2006 | Olle | F16L 3/11 |
| | | | 248/58 |
| 2007/0152108 A1 * | 7/2007 | Wilson | F16L 3/1025 |
| | | | 248/58 |
| 2008/0203239 A1 * | 8/2008 | Deichman | F16L 3/11 |
| | | | 248/58 |
| 2009/0200435 A1 | 8/2009 | Duggan | |
| 2012/0160983 A1 | 6/2012 | Gousseinov et al. | |
| 2014/0008500 A1 * | 1/2014 | Cousineau | F16L 3/11 |
| | | | 248/62 |
| 2016/0115981 A1 * | 4/2016 | Duggan | F16B 2/14 |
| | | | 248/65 |
| 2016/0252197 A1 * | 9/2016 | Roth | F16L 3/133 |
| | | | 248/548 |
| 2017/0002956 A1 * | 1/2017 | Roth | F16L 3/20 |
| 2017/0122353 A1 | 5/2017 | Halliburton | |
| 2021/0025415 A1 * | 1/2021 | Liao | G10D 13/28 |
| 2021/0080033 A1 * | 3/2021 | Belen | F16B 39/108 |
| 2021/0177185 A1 * | 6/2021 | DiTrolio | F16B 7/0433 |

FOREIGN PATENT DOCUMENTS

| | | | |
|---|---|---|---|
| JP | 2961365 B1 * | 10/1999 | F16L 3/14 |
| JP | 4938444 | 5/2012 | |

* cited by examiner

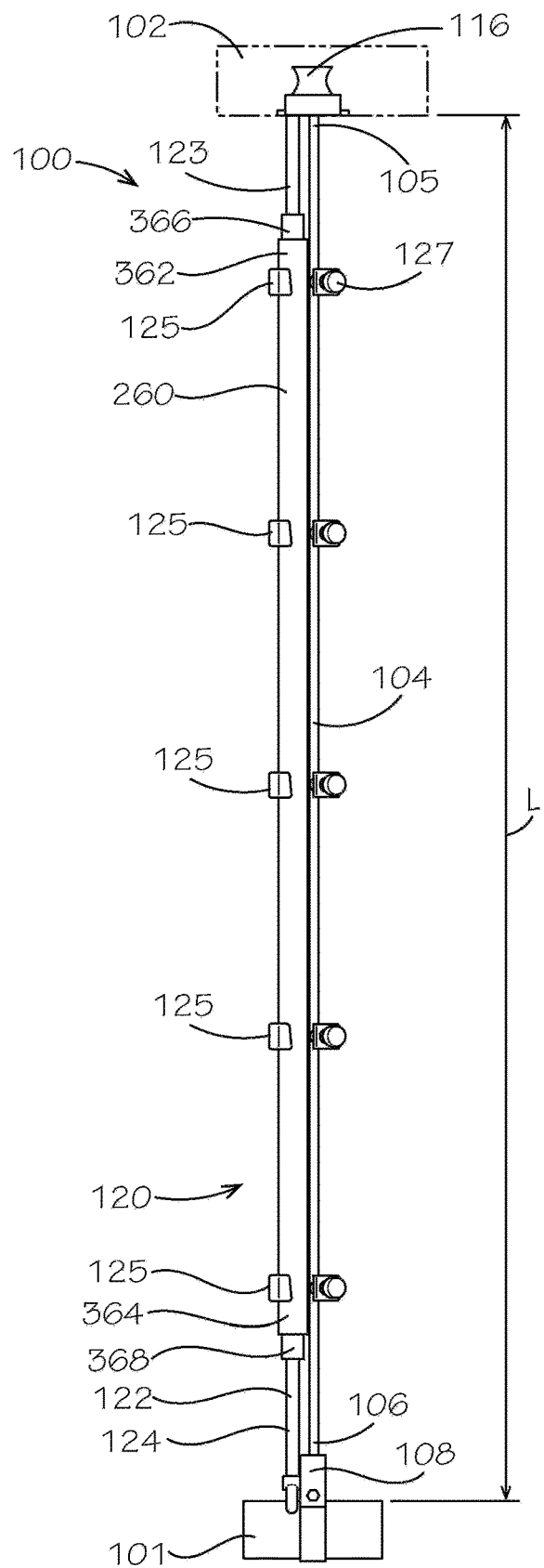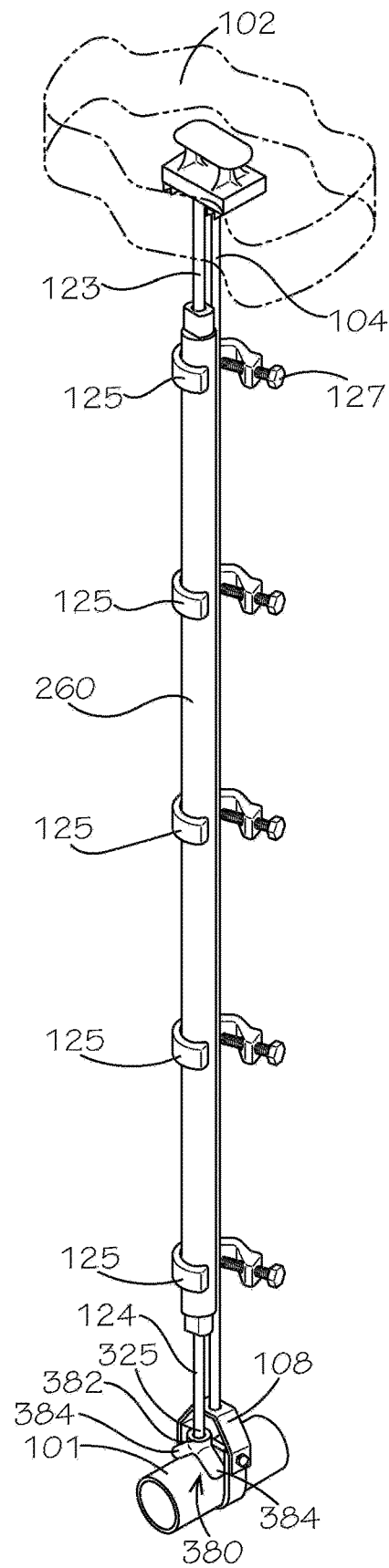
FIG. 3B  FIG. 3C

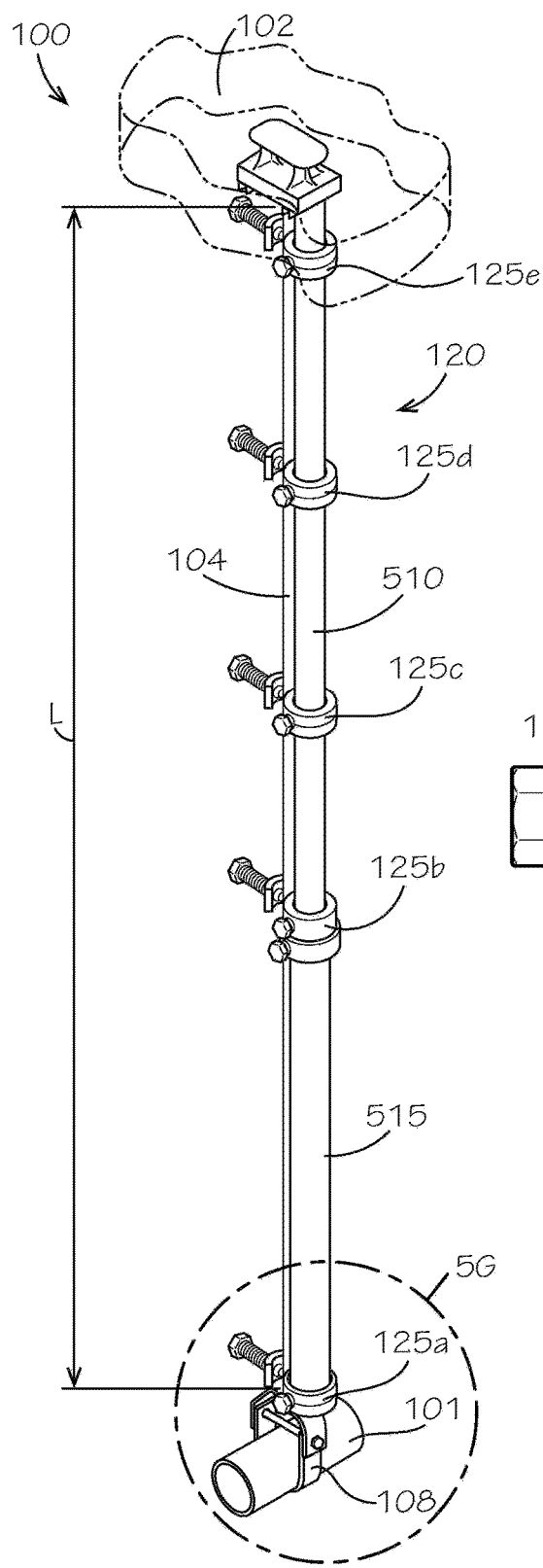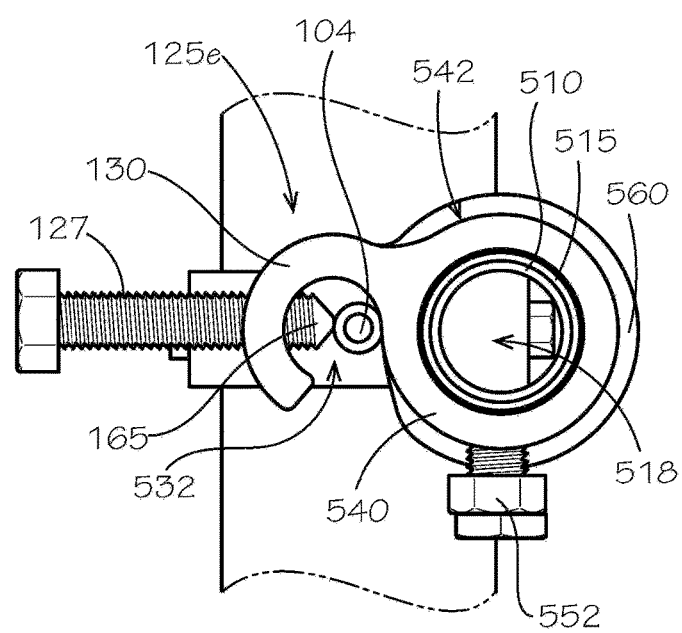
FIG. 5E
FIG. 5F

STIFFENING SYSTEM FOR HANGER ASSEMBLY

TECHNICAL FIELD

This disclosure relates to hanger assemblies. More specifically, this disclosure relates to stiffening system for reinforcing a hanger assembly.

BACKGROUND

Hanger assemblies can be provided to support piping from the ceilings of building structures (e.g., homes, office buildings, etc.). For example, the piping may be included in a fire suppression system, a plumbing system, an electrical wiring system, or the like. Typically, hanger assembly comprise a support rod coupled to and extending downward from the ceiling and a hanger coupled to the support rod distal to the ceiling. The hanger can engage and support the piping. The support rod can be configured to bear the downward weight of the hanger assembly and the piping. However, the support rod often buckles under the multi-direction forces undergone during a seismic event.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a stiffening system for a hanger assembly can comprise a stiffener rod; a brace member oriented parallel to the stiffener rod; a stiffening connector coupling the brace member to the stiffener rod, the stiffening connector defining a connector hook and a fastener hole, the connector hook defining a hook recess, a portion of the brace member received in the hook recess; and a connector fastener extending through the fastener hole, the connector fastener pressing the stiffener rod into a corner region defined between the brace member and the stiffening connector Also disclosed is a hanger assembly comprising a support rod defining an upper end and a lower end; a hanger coupled to the support rod at a lower end, the hanger configured to support piping; and a stiffening system comprising a brace member and a stiffener rod, the stiffening system further comprising a first stiffening connector coupling the brace member to the support rod and a second stiffening connector coupling the stiffener rod to the brace member, wherein the stiffener rod is coupled to the hanger by a hanger connection assembly.

Also disclosed is a method of reinforcing a hanger comprising providing a stiffening system and a hanger assembly, the hanger assembly comprising a support rod and a hanger, the stiffening system comprising a stiffener rod and a brace member; positioning the stiffening system adjacent to the support rod in a shortened configuration; coupling the brace member to the support rod with a first stiffening connector; moving the stiffener rod relative to the brace member to orient the stiffening system in a lengthened configuration; coupling the stiffener rod to the brace member in the lengthened configuration with a second stiffening connector; and coupling the stiffener rod to the hanger with a hanger connection assembly.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 3B is a front view of the hanger assembly according to another aspect of the disclosure, comprising the stiffening connector of FIG. 3A.

FIG. 3C is a top perspective view of the hanger assembly of FIG. 3B.

FIG. 5E is a top perspective view illustrating a second step in installing the stiffening system of FIG. 5C with the hanger assembly of FIG. 5C.

FIG. 5F is a top view of the hanger assembly of FIG. 5C, illustrating the second step in installing the stiffening system of FIG. 5C.

DETAILED DESCRIPTION

Figure 1A:
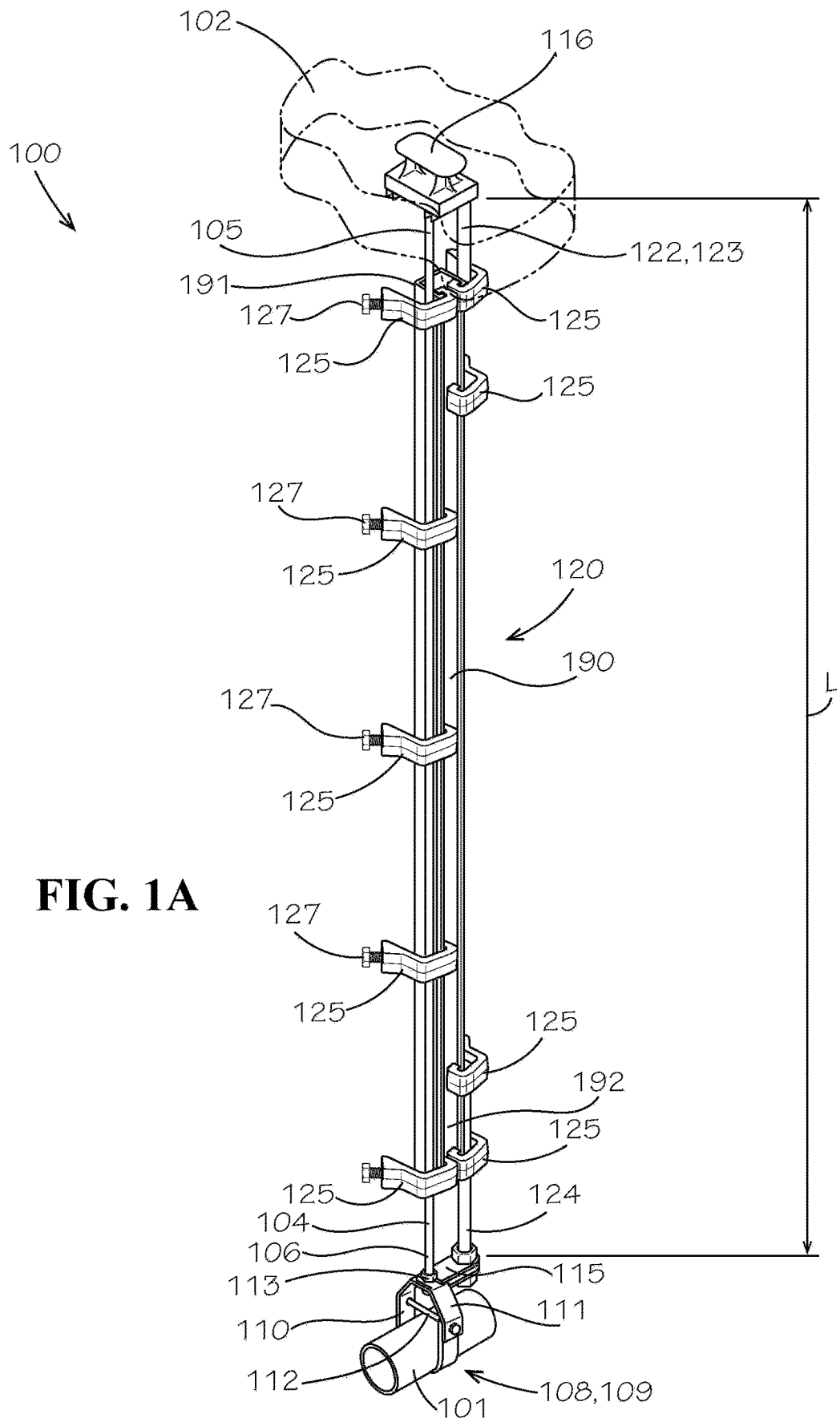
FIG. 1A is a top perspective view of a hanger assembly comprising a stiffening system, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a stiffening system for a hanger assembly and associated methods, systems, devices, and various apparatus. The stiffening system can be configured to provide reinforcement to the hanger assembly. Example aspects of the stiffening system can comprise a stiffener rod and one or more stiffening connectors for coupling the stiffener rod to a support rod of the hanger assembly. It would be understood by one of skill in the art that the stiffening system is described in but a few exemplary embodiments among many. No particular terminology or description should be considered limiting on the disclosure or the scope of any claims issuing therefrom.

FIG. 1A is a top perspective view of a hanger assembly 100, in accordance with one aspect of the present disclosure. According to example aspects, the hanger assembly 100 can be configured to support piping 101 from a ceiling 102 of a building structure (e.g., a home, office building, etc.). For example, the piping 101 can be part of a fire suppression system, a plumbing system, an electrical wiring system, or the like. As shown, example aspects of the hanger assembly 100 can comprise a support rod 104 and a hanger 108. The support rod 104 can define an elongated, substantially cylindrical structure having an upper end 105 and lower end 106, relative to the orientation shown. In some aspects, the support rod 104 can define external threading along a length thereof, or partially along the length thereof. The support rod 104 can be configured to extend between the ceiling 102 and the hanger 108, as shown. In example aspects, the upper end 105 of the support rod 104 can be configured to engage a ceiling insert 116 mounted on or within the ceiling 102. In other aspects, the upper end 105 of the support rod 104 can be coupled to the ceiling 102 by any other suitable fastening method know in the art.

According to example aspects, the lower end 106 of the support rod 104 can be coupled to the hanger 108, and the hanger 108 can support the piping 101, such that the piping 101 can be suspended from the ceiling 102 above a ground surface. In some aspects, the hanger 108 can be a clevis-type hanger 109. In other aspects, the hanger 108 can be any other suitable type of piping hanger known in the art. The hanger 108 can comprise a substantially U-shaped lower hanger member 110 configured to cradle the piping 101, as shown. An upper hanger member 111 can be fastened to the lower hanger member 110 by a hanger fastener 112, such as, for example, a bolt, or any other suitable fastener known in the art. The lower end 106 of the support rod 104 can extend through a hanger opening 710 (shown in FIG. 7A) in the upper hanger member 111, and can be attached to upper hanger member 111 by one or more fasteners. For example, in some aspects, the fasteners can comprise one or more threaded nuts 113, and in other aspects, the fasteners can comprise any other suitable fasteners known in the art.

Figures 2A, 2B:
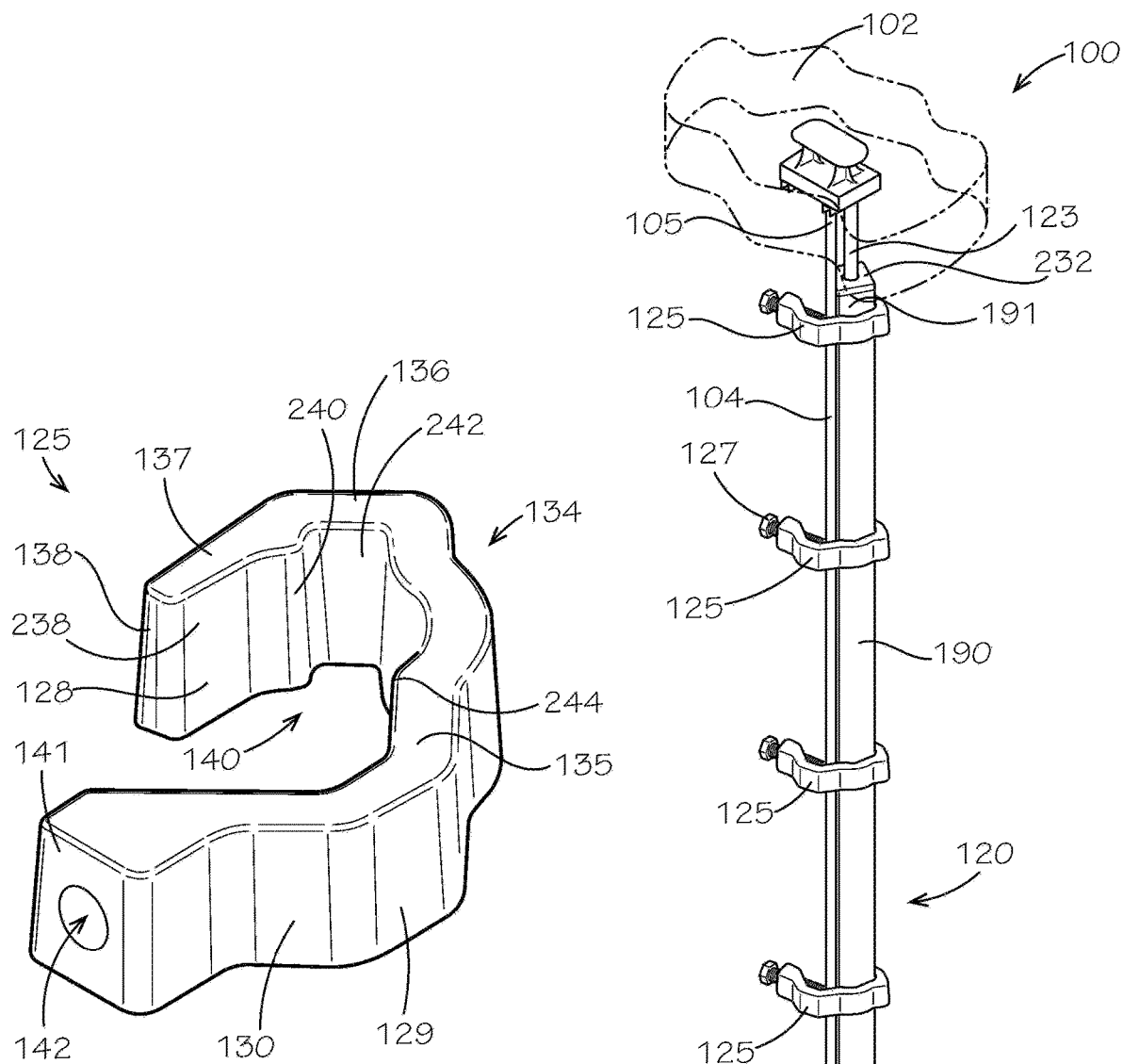
FIG. 2A is a perspective view of the stiffening connector according to another aspect of the present disclosure.
FIG. 2B is a top perspective view of the hanger assembly according to another aspect of the disclosure, comprising the stiffening connector of FIG. 2A.

Example aspects of the hanger assembly 100 can further comprise a stiffening system 120 configured to reinforce the hanger assembly 100. The reinforcement of the hanger assembly 100 by the stiffening system 120 can be beneficial, for example, during a seismic event, such as an earthquake, wherein multi-directional forces, including upward forces, may be applied to the piping 101. In such instances, some or all of the multi-directional forces can be distributed to the stiffening system 120 to reduce or eliminate the forces applied to the support rod 104. Example aspects of the stiffening system 120 can comprise at least one stiffener rod 122, as well as one or more stiffening connectors 125 for coupling stiffener rod(s) 122 to the support rod 104. In the present aspect, the stiffening system 120 can comprise two of the stiffener rods 122—an upper stiffener rod 123 and a lower stiffener rod 124, relative to the orientation shown. Each of the upper and lower stiffener rods 123,124 can define an elongated, substantially cylindrical structure, as shown. The upper stiffener rod 123 can be oriented adjacent to the upper end 105 of the support rod 104, and the lower stiffener rod 124 can be oriented adjacent to the lower end 106 of the support rod 104. In the present aspect, the upper stiffener rod 123 can abut or otherwise engage the ceiling 102 and can extending substantially downward therefrom, relative to the orientation shown. Furthermore, in the present aspect, the lower stiffener rod 124 can engage the hanger 108 and can extend substantially upward therefrom, relative to the orientation shown. For example, in the present aspect, the lower stiffener rod 124 can be connected to the hanger 108 by a hanger connection assembly 115, as shown and described in further detail below with reference to FIGS. 7A-9. In other aspects, the lower stiffener rod 124 may not engage the hanger 108. For example, in some aspects, the lower stiffener rod 124 can instead abut or otherwise engage the piping 101, as shown in FIG. 2B, and in still other aspect, the lower stiffener rod 124 may not engage either of the hanger 108 or piping 101. For example, as described below with reference to FIG. 10, a lower connector 1010 (shown in FIG. 10) may be provided for coupling the lower stiffener rod 124 to the support rod 104. As shown, according to example aspects, each of the upper and lower stiffener rods 123,124 can be oriented about parallel with the support rod 104. Example aspects of the stiffener rod(s) 122 can be formed from a metal material, such as steel. In other aspects, the stiffener rod(s) 122 can be formed from any other suitable material known in the art.

In the present aspect, the stiffening system 120 can further comprise an elongated brace member, such as a strut 190, positioned between the support rod 104 and the upper and lower stiffener rods 123,124. Example aspects of the strut 190 can be formed from a metal material, such as steel. In other aspects, the strut 190 can be formed from any other suitable material known in the art. The elongated strut 190 can be oriented about parallel to and can extend substantially along the length of the support rod 104, though in the present aspect, the upper end 105 and lower end 106 of the support rod 104 can each extend past first and second ends 191,192 of the elongated strut 190, respectively. One or more of the stiffening connectors 125 can be provided for coupling the support rod 104 to the strut 190, and one or more of the stiffening connectors 125 can be provided for coupling each of the upper and lower stiffener rods 123,124 to the strut 190. Thus, the support rod 104 can be effectively coupled to the upper and lower stiffener rods 123,124 by the attachment of each of the support rod 104, upper stiffener rod 123, and lower stiffener rod 124 to the strut 190. According to example aspects, a connector fastener 127, such as, for example, a bolt or a screw, can secure each of the stiffening connectors 125 to the strut 190 and to the corresponding support rod 104, upper stiffener rod 123, and lower stiffener rod 124. In some aspects, the connector fastener 127 can be threaded. For example, in a particular aspect, the connector fastener 127 can be a cone point screw bolt, as best seen in FIG. 1C, or any other suitable fastener known in the art. As shown, in example aspects, the stiffening system 120 can define a length L, which can be about equal to a length of the support rod 104 when the stiffening system is in a lengthened configuration.

Figure 1B:
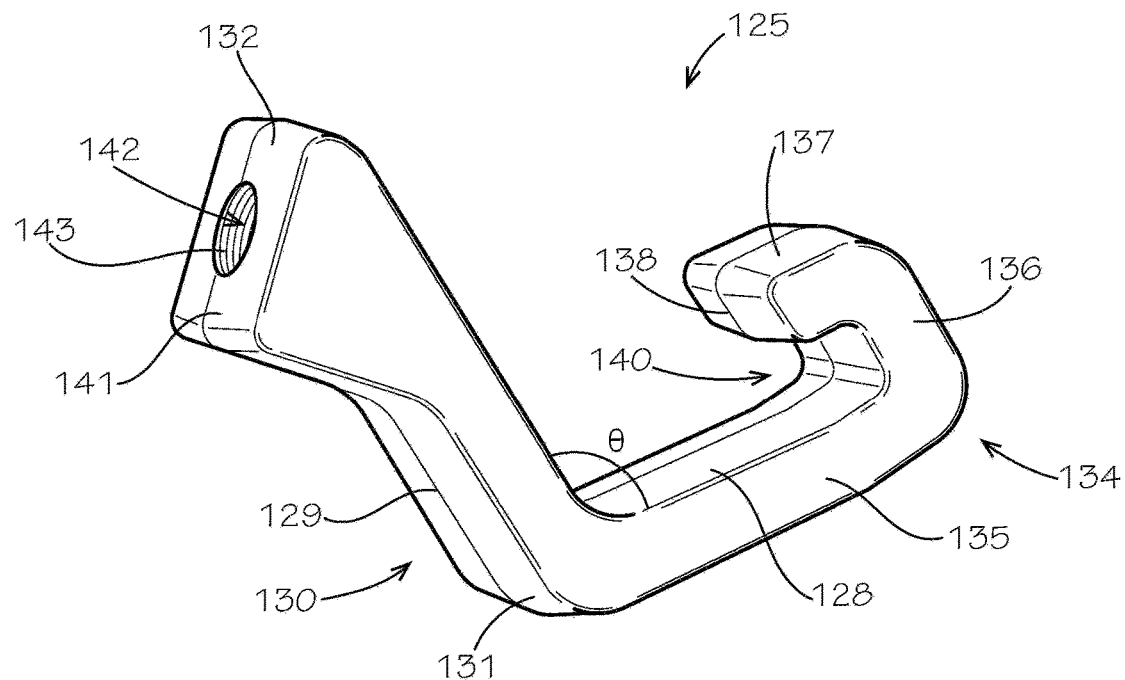
FIG. 1B is a perspective view of a stiffening connector of the stiffening system of FIG. 1A.
Figure 1C:
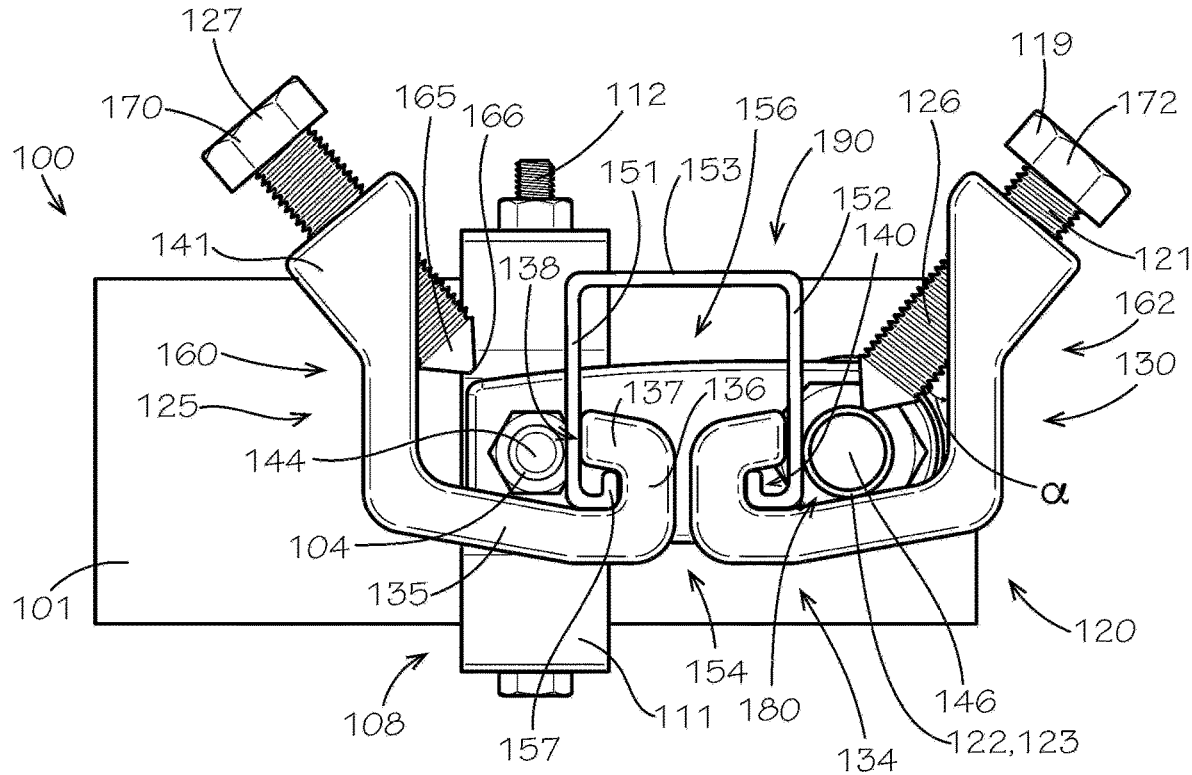
FIG. 1C is a top view of the hanger assembly of FIG. 1A.

FIG. 1B illustrates a one of the stiffening connectors 125. As shown, the stiffening connector 125 of the present aspect can generally define an inner connector surface 128 and an outer connector surface 129. The stiffening connector 125 can further define a connector body 130 and connector hook 134 extending from a first connector body end 131 of the connector body 130. Example aspects of the connector hook 134 can generally define a J-shape, and can comprise a shank 135, a bend 136, and a finger 137. A hook recess 140 can be defined by the inner connector surface 128 of the stiffening connector 125 between the shank 135 and the finger 137, as shown. Moreover, a finger end wall 138 can extend between the inner connector surface 128 and outer connector surface 129 at a distal end of the finger 137. In some aspects, the connector hook 134 can extend from the connector body 130 at a substantially obtuse angle θ, as shown. In other aspects, the angle θ may be a right angle or may be acute. According to example aspects, the stiffening connector 125 can further define a connector fastener pad 141 oriented generally at a second connector body end 132 of the connector body 130, opposite the connector hook 134. A fastener hole 142 can be formed through the fastener pad 141, as shown, and can extend from the outer connector surface 129 of the stiffening connector 125 to the inner connector surface 128. As such, in the present aspect, the fastener hole 142 can be a through-hole, and in some aspects, the fastener hole 142 can define internal threading 143. According to example aspects, the connector fastener 127 (shown in FIG. 1) can be configured to threadably and adjustably engage the fastener hole 142, as described in further detail below. In example aspects, the stiffening connectors 125 can be formed from a metal material, such as, for example, iron, and more specifically ductile iron in some aspects. In other aspects, the stiffening connectors 125 can be formed from any other suitable material known in the art, including, but not limited to, plastics, composites, other metals, and the like.

FIG. 1C illustrates a top view of the hanger assembly 100 comprising the stiffening system 120. As shown, the strut 190 can define a substantially square cross-section, and can comprise two opposing strut sidewalls 151,152 and one strut end wall 153 extending between the opposing strut sidewalls 151,152. An open end 154 can be defined opposite the strut end wall 153. The strut sidewalls 151,152 and strut end wall 153 of the strut 190 can define an interior strut channel 156. According to example aspects, each of the strut sidewalls 151,152 can define an inwardly curving strut lip 157 extending therefrom at the open end 154 of the strut 190, opposite the strut end wall 153. As described above, the strut 190 can be received between the support rod 104 and each of the upper and lower stiffener rods 123,124 (lower stiffener rod 124 shown in FIG. 1A), such that a first one of the strut sidewalls 151 can extend along the support rod 104 and a second one of the strut sidewalls 152 can extend along the upper and lower stiffener rods 123,124. In the present aspect, two of the stiffening connectors 125 (e.g., a first stiffener connector 160 and a second stiffening connector 162) and two corresponding connector fasteners 127 (e.g., a first connector fastener 170 and a second connector fastener 172) can be provided for coupled the strut 190 to the support rod 104 and the upper stiffener rod 123, respectively. As shown, the first stiffening connector 160 can be provided for coupling the support rod 104 to the strut 190. According to example aspects, the connector hook 134 of the first stiffening connector 160 can engage the strut 190. For example, as shown, the bend 136 and the finger 137 of the connector hook 134 of the first stiffening connector 160 can extend into the interior strut channel 156 through the open end 154 of the strut 190. In example aspects, a portion of the first strut sidewall 151 of the strut 190, such as the corresponding inwardly curving strut lip 157 of the first strut sidewall 151, can be received within the corresponding hook recess 140. Furthermore, the finger end wall 138 can abut the first strut sidewall 151 within the interior strut channel 156. As such, the first strut sidewall 151 can be sandwiched between the finger 137 of the connector hook 134 and the support rod 104.

According to example aspects, each of the connector fasteners 127 can define external threading 126. To fasten the first stiffening connector 160 to the support rod 104, the first connector fastener 170 can threadably engage the internal threading 143 (shown in FIG. 1B) of the fastener hole 142 (shown in FIG. 1B) in the fastener pad 141 and can extend through the fastener hole 142, as shown. In example aspects, the fastener hole 142 of each stiffening connector 125 can be oriented at an acute angle α relative to the connector body 130, such that the corresponding connector fastener 127 can extend at the acute angle α relative to the connector body 130. In other aspects, the fastener hole 142 can be oriented at any other suitable orientation relative to the connector body 130, including at a right angle or an obtuse angle. Thus, each of the connector fasteners 127 can extend in a direction generally towards the corresponding connector hook 134, as shown. The first connector fastener 170 can be tightened until a first fastener end 165 of the first connector fastener 170 presses into the support rod 104 at a desired force. As mentioned above, in some aspects, each of the connector fasteners 127 can be a cone point screw bolt. Example aspects of the connector fasteners 127 can define a head 119 and a shaft 121 extending from the head 119. The external threading 126 can be formed on the shaft 121. The shaft 121 can define the first fastener end 165 distal from the head 119, and in some aspects, the first fastener end 165 can define a point 166, as shown. As such, as shown, the point 166 of the first fastener end 165 of the first connector fastener 170 can press into the support rod 104 in the present aspect. In example aspects, the first connector fastener 170 can press the support rod 104 into a corner region 180 defined between the shank 135 of the first stiffening connector 160 and the first strut sidewall 151 of the strut 190. Moreover, the force of the first connector fastener 170 against the support rod 104 can clamp the support rod 104 and the first strut sidewall 151 between the connector hook 134 of the first stiffening connector 160 and the first connector fastener 170 to reinforce the support rod 104 with the strut 190. In some aspects, as shown, the size of the support rod 104 and/or the angle α of the first connector fastener 170 can be configured such that the first connector fastener 170 can press against the support rod 104 in a substantially radial direction, relative to a support rod axis 144 (going into the page) of the support rod 104. In other aspects, however, the first connector fastener 170 may not press against the support rod 104 in a radial direction.

The second stiffening connector 162 can similarly fasten the upper stiffener rod 123 to the second strut sidewall 152 of the strut 190. The bend 136 and finger 137 of the corresponding connector hook 134 can extend into the interior strut channel 156, and the inwardly curving strut lip 157 of the second strut sidewall 152 can be received within the corresponding hook recess 140. The second connector fastener 172 can threadably engage and extend through the corresponding fastener hole 142 in the second stiffening connector 162, and can be tightened until the first fastener end 165 thereof presses into the upper stiffener rod 123 at a desired force. The force of the second connector fastener 172 against the upper stiffener rod 123 can clamp the upper stiffener rod 123 and the second strut sidewall 152 between the second stiffening connector 162 and the second connector fastener 172 to further reinforce the support rod 104 with the upper stiffener rod 123. Moreover, in the present aspect, the upper stiffener rod 123 can define a diameter than can be greater than a diameter of the support rod 104, and as such, the corresponding second connector fastener 172 may press into the upper stiffener rod 123 in a non-radial direction, relative to an upper stiffener rod axis 146 of the upper stiffener rod 123. Furthermore, in other aspects, one or both of the upper and lower stiffener rods 123,124 may be coupled to the strut 190 prior to coupling the support rod 104 to the strut 190.

According to example aspects, at least another one of the stiffening connectors 125 can be provided for fastening the lower stiffener rod 124 to the second strut sidewall 152 of the strut 190 in substantially the same manner. Moreover, as shown in FIG. 1A, the hanger assembly 100 can comprise additional stiffening connectors 125 for providing further points of connection between the strut 190 and the support rod 104, upper stiffener rod 123, and lower stiffener rod 124, as desired. According to example aspects, the stiffening system 120 can be installed with the hanger assembly 100 during installation of the hanger assembly 100 within the building structure, or can be installed with an existing, previously-installed hanger assembly 100. According to example aspects, a length L (shown in FIG. 1A) of the stiffening system 120 can be selectively adjustable to allow for easy installation of the stiffening system 120 with an existing hanger assembly 100. For example, in the present aspect, some or all of the stiffener rods 122 (e.g., the upper stiffener rod 123 and lower stiffener rod 124) can movable relative to the brace member (e.g., the strut 190) to adjust a length of the stiffening system 120. Example aspects of the stiffening system can be selectively adjustable between the lengthened configuration (as shown in FIG. 1A, and a shortened configuration, an example of which is shown in FIG. 5E. For example, in the present aspect, each of the upper and lower stiffener rods 123,124 can be configured to slide up and down, relative to the orientation shown, along the second strut sidewall 152 of the strut 190. In the shortened configuration, the stiffening system 120 can be easily positioned between the ceiling 102 and the hanger 108 in a substantially vertical orientation, relative to the orientation shown, adjacent to the vertically-oriented support rod 104. The stiffening system 120 can then be lengthened to the lengthened configuration to engage the ceiling 102 and the hanger 108, as shown in FIG. 1A. The stiffening connectors 125 can couple the stiffening system 120 to the support rod 104 in the lengthened configuration to reinforce the hanger assembly 100.

As such, according to example aspects, a method for reinforcing the hanger assembly 100 can comprise providing the stiffening system 120 and the hanger assembly 100, wherein the hanger assembly 100 can comprise at least the support rod 104 and the hanger 108, and wherein the stiffening system 120 can comprise at least one of the stiffener rods 122 (e.g., the upper stiffener rod 123 and lower stiffener rod 124) and the brace member (e.g., the strut 190). The method can further comprise positioning the stiffening system 120 adjacent to the support rod 104 in the shortened configuration, coupling the brace member to the support rod 104 with the first stiffening connector 160, and moving the stiffener rod 122 relative to the brace member to orient the stiffening system 120 in the lengthened configuration, and coupling the stiffener rod 122 to the brace member in the lengthened configuration with the second stiffening connector 162. Some example aspects of the method can further comprise coupling the stiffener rod 122 to the hanger 108 with the hanger connection assembly 115 (shown in FIG. 1A).

FIG. 2A illustrates the stiffening connector 125 according to another aspect of the present disclosure. Similar to the stiffening connector 125 of FIGS. 1A-1C, the stiffening connector 125 of the present aspect can define the inner connector surface 128 and the outer connector surface 129. The stiffening connector 125 can also generally define the connector body 130 and the connector hook 134 extending therefrom. The connector hook 134 can define the hook recess 140, and the fastener pad 141 of the connector body 130 can define the fastener hole 142 extending from the outer connector surface 129 to the inner connector surface 128. In the present aspect, the inner connector surface 128 of the stiffening connector 125 can further define a plurality of features configured to aid in properly securing the stiffening connector 125 to the hanger assembly 100 (shown in FIG. 2B). For example, as shown, the finger 137 can define a finger abutment surface 238 proximate to the finger end wall 138 and a finger lip 240 proximate to the bend 136. The finger lip 240 can extend inward towards the hook recess 140 and can aid in defining a designated strut lip engagement region 242 generally between the finger 137 and the shank 135, and proximate to the bend 136, as shown. Additionally, example aspects of the inner connector surface 128 can generally define an inwardly extending strut engagement edge 244 of the shank 135. The features are described in further detail below with reference to FIGS. 2B-2C.

FIG. 2B illustrates the hanger assembly 100 according to another example aspect of the present disclosure, wherein the stiffening system 120 of the hanger assembly 100 comprises a plurality of the stiffening connectors 125 of FIG. 2A. As shown, the hanger assembly 100 can comprise the support rod 104 and the hanger 108. The support rod 104 can extend between the ceiling 102 of the building structure and the hanger 108, and the hanger 108 can support the piping 101. The hanger assembly 100 can further comprise the stiffening system 120. The stiffening system 120 can comprise the upper and lower stiffener rods 123,124 in the present aspect. In other aspects, the stiffening system 120 can comprise additional stiffener rods 122, or may comprise only one of the stiffener rods 122. According to example aspects, the stiffening system 120 can further comprise the brace member, such as the strut 190, and in the present aspect, the upper stiffener rod 123 can extend into the interior strut channel 156 (shown in FIG. 2C) at the first end 191 of the strut 190 and the lower stiffener rod 124 can extend into the interior strut channel 156 at the second end 192 of the strut 190. In some aspects, as shown, a strut cap 232 can be provided at each of the first end 191 and second end 192 of the strut 190. Each of the strut caps 232 can define a strut cap opening 234 (shown in FIG. 2E) formed therethrough. Each of the upper and lower stiffener rods 123,124 can extend through the strut cap opening 234 of the corresponding strut cap 232 to guide the upper and lower stiffener rods 123,124 into the interior strut channel 156. According to some example aspects, each of the upper and lower stiffener rods 123,124 can define external threading, and the strut cap opening 234 can define internal threading 235 (shown in FIG. 2E) configured mate with the external threading of the upper and lower stiffener rods 123,124. Rotating the upper and lower stiffener rods 123,124 within the corresponding strut cap openings 234 can reposition the upper and lower stiffener rods 123,124 relative to the strut caps 232 to adjust the stiffening system 120 between the shortened and lengthened configurations, as described above. The strut caps 232 are shown and described in further detail with respect to FIG. 2E. In other example aspects, the upper and lower stiffener rods 123,124 may be configured to slide within the corresponding strut cap opening 234 to adjust the stiffening system 120 between the shortened and lengthened configurations. In such an aspect, the strut caps 232 can be configured to secure the corresponding upper and lower stiffener rods 123,124 in place once the stiffening system 120 is in the lengthened configuration. For example, in some aspects, a friction fit between each of strut caps 232 and the upper and lower stiffener rods 123,124 can allow the upper and lower stiffener rods 123,124 to slide within the corresponding strut cap openings 234 when a suitable force is applied, but can otherwise maintain the upper and lower stiffener rods 123,124 in a desired position relative to the strut 190. According to example aspects, one or more of the stiffening connectors 125 can be provided for coupling the support rod 104, strut 190, and upper and lower stiffener rods 123,124 together to reinforce the hanger assembly 100.

Figure 2C:
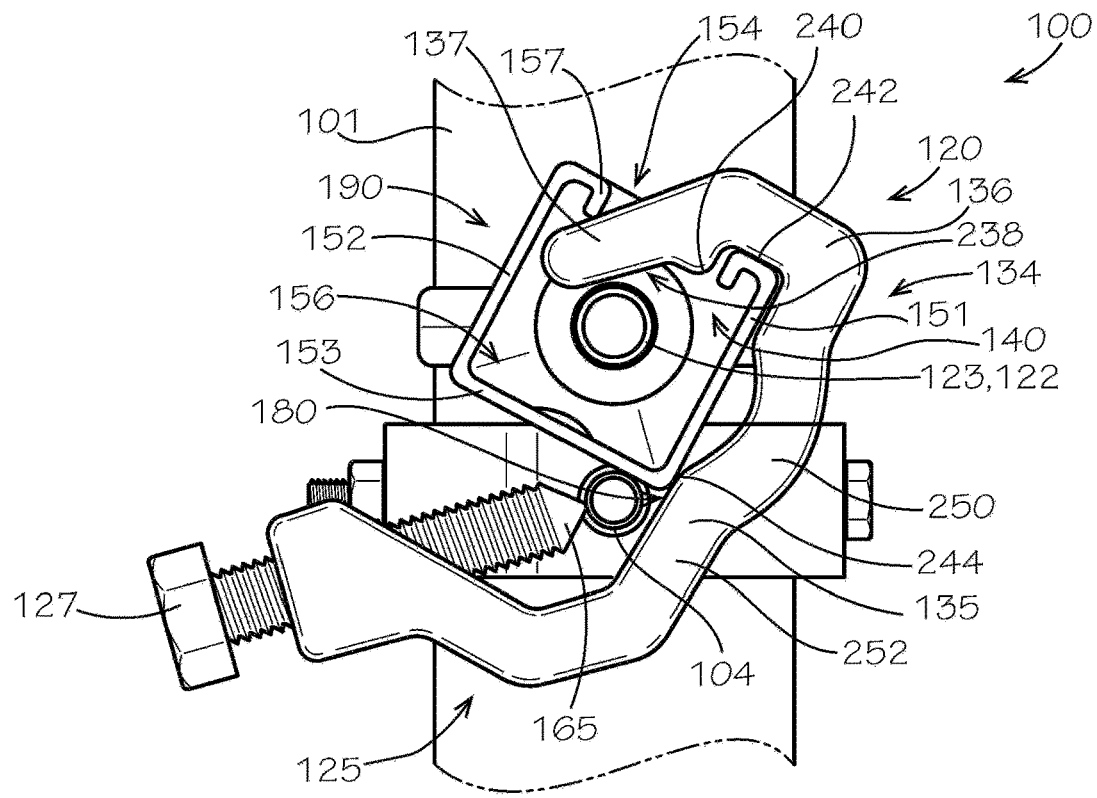
FIG. 2C is a top view of the hanger assembly of FIG. 2B.

FIG. 2C illustrates a top view of the hanger assembly 100 of FIG. 2B, illustrating a top one of the stiffening connectors 125 coupling the stiffening assembly with the support rod 104. As shown, each of the upper stiffener rod 123, lower stiffener rod 124 (shown in FIG. 2B), and strut 190 can be oriented about parallel to the support rod 104. Each of the upper and lower stiffener rods 123,124 can extend into the interior strut channel 156 of the strut 190. In example aspects, the finger 137 of the connector hook 134 can extend into the interior strut channel 156 through the open end 154 of the strut 190. The finger 137 can generally be received between the upper stiffener rod 123 and the strut lip 157 of the second strut sidewall 152 of the strut 190, and the finger abutment surface 238 of the finger 137 can abut the upper stiffener rod 123. Moreover, the strut lip 157 of the first strut sidewall 151 of the strut 190 can be received within the designated strut lip engagement region 242, as shown. In example aspects, a bowed portion 250 of the shank 135 of the connector hook 134 can bow outward away from the first strut sidewall 151 between the bend 136 and the strut engagement edge 244. The strut engagement edge 244 can be configured to abut the first strut sidewall 151 proximate to the strut end wall 153 of the strut 190. As such, as shown, the upper stiffener rod 123 and the first strut sidewall 151 of the strut 190 can generally be wedged within the hook recess 140 of the stiffening connector 125. Furthermore, according to example aspects, the support rod 104 can be oriented generally at the corner region 180 defined between the strut end wall 153 and a substantially straight portion 252 of the shank 135 of the stiffening connector 125. The connector fastener 127 can threadably engage and extend through the corresponding fastener hole 142, and can be tightened until the first fastener end 165 thereof presses into the support rod 104 at a desired force. As shown, the connector fastener 127 can press the support rod 104 into the corner region 180 against the strut end wall 153 and the shank 135 to reinforce the support rod 104 with the stiffening system 120.

Figure 2D:
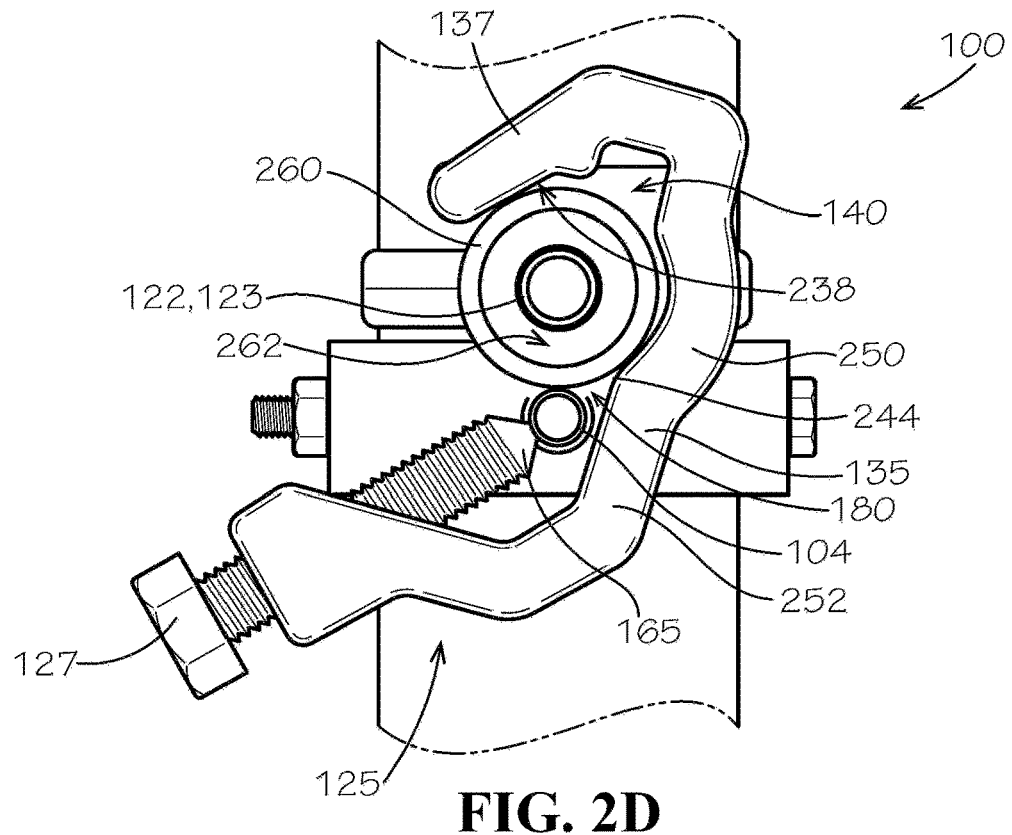
FIG. 2D is a top view of the hanger assembly according to another aspect of the present disclosure.

FIG. 2D illustrates an aspect of the hanger assembly 100 that can be similar to the hanger assembly 100 of FIG. 2C. However, in the present aspect, the hanger assembly 100 does not comprise the strut 190 (shown in FIG. 2C), and rather can comprise a pipe segment 260 in place of the strut 190. Example aspects of the pipe segment 260 can be formed from a metal material, such as steel. In other aspects, the pipe segment 260 can be formed from any other suitable material known in the art. As shown, the pipe segment 260 can be substantially cylindrical in shape can define a substantially circular cross-section. A pipe channel 262 can be defined through a center of the pipe segment 260, and each of the upper stiffener rod 123 and the lower stiffener rod 124 (shown in FIG. 2B) can extend into the pipe channel 262. The pipe segment 260 can be received within the hook recess 140 of the stiffening connector 125, and can generally be wedged between the finger abutment surface 238 of the finger 137 and the bowed portion 250 of the shank 135. The strut engagement edge 244 of the shank 135 may further abut the pipe segment 260, as shown. In example aspects, the corner region 180 can be generally defined between the straight portion 252 of the shank 135 and the pipe segment 260, and the support rod 104 can be oriented at or near the corner region 180. Like the hanger assembly 100 of FIG. 2C, the connector fastener 127 can threadably engage and extend through the corresponding fastener hole 142 (shown in FIG. 2A), and can be tightened until the first fastener end 165 thereof presses the support rod 104 into the corner region 180 against the pipe segment 260 and the shank 135 at a desired force.

Figure 2E:
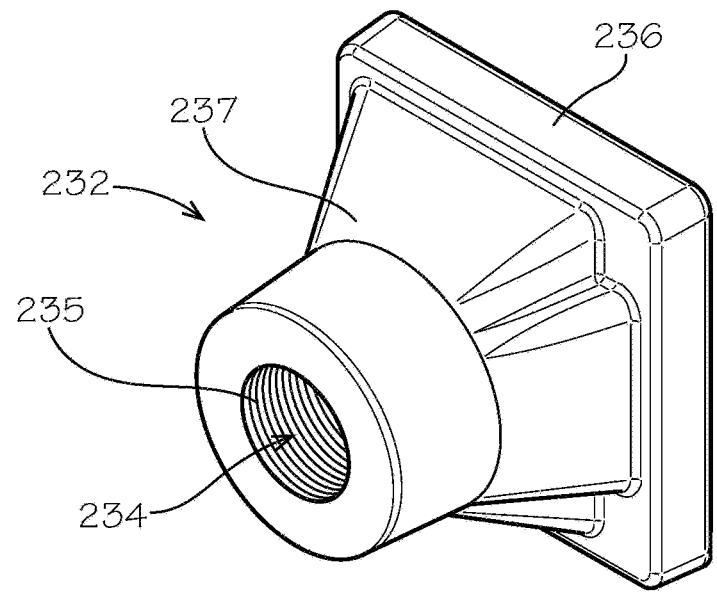
FIG. 2E is a bottom perspective view of a strut cap of the hanger assembly of FIG. 2B.

FIG. 2E illustrates an example aspect of one of the strut caps 232. As shown, the strut cap 232 can define the strut opening 234, through which the corresponding upper or lower stiffener rod 123,124 (shown in FIG. 2B) can extend. In some aspects, the strut opening 234 can define the internal threading 235, as shown, which can be configured to mate with external threading on the corresponding upper or lower stiffener rod 123,124. Furthermore, as shown, example aspects of the strut caps 232 can generally define a exterior portion 236, which can be oriented external to the interior strut channel 156 (shown in FIG. 2C) of the strut 190 (shown in FIG. 2B), and an interior portion 237, which can be oriented within the interior strut channel 156 when the stiffening system 120 (shown in FIG. 2B) is assembled. In the present aspect, the interior portion 237 can generally taper away from the exterior portion 236, such that the exterior portion 236 can define a width greater than a width of the interior portion 237. The exterior portion 236 of the strut cap 232 can be configured to abut the corresponding first or second end 191,192 (shown in FIG. 2B) of the strut 190, and the increased width of the exterior portion 236 can prohibit the exterior portion 236 from entering the interior strut channel 156. In example aspects, the strut caps 232 can be formed from a metal material, such as, for example, iron, and more specifically ductile iron in some aspects. In other aspects, the strut caps 232 can be formed from any other suitable material known in the art, including, but not limited to, plastics, composites, other metals, and the like.

Figure 3A:
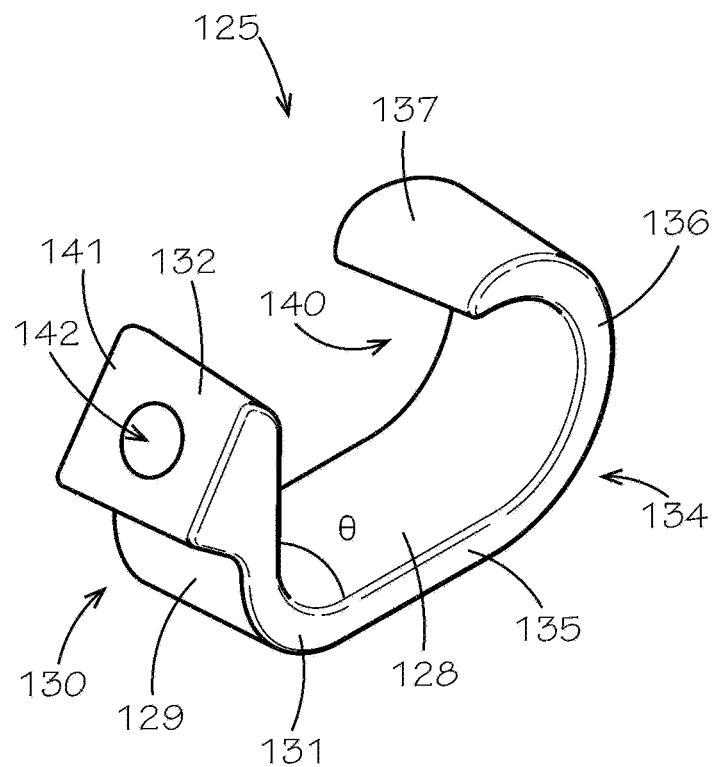
FIG. 3A is a perspective view of the stiffening connector according to another aspect of the present disclosure.

FIG. 3A illustrates the stiffening connector 125 according to another example aspect of the present disclosure. As shown, in the present aspect, the stiffening connector 125 can define the inner connector surface 128 and the outer connector surface 129, and can comprise the connector hook 134 and the connector body 130 extending from the connector hook 134. The connector hook 134 can substantially define a J-shape, and can comprise the shank 135, the bend 136, and the finger 137. The connector hook 134 can further define the hook recess 140, which can define a substantially semicircular cross section in the present aspect. The connector hook 134 can extend from the first connector body end 131 of the connector body 130, as shown, and the fastener pad 141 can be oriented at the second connector body end 132. In the present aspect, the connector body 130 can be oriented about perpendicular relative to the shank 135 (e.g., at about 90° relative to the shank 135) or the angle θ can be slightly greater than 90° in some aspects. In other aspects, the connector body 130 can extend from the shank 135 at a greater or lesser angle. The fastener hole 142 can be formed through the fastener pad 141, extending from the inner connector surface 128 to the outer connector surface 129. Like the other aspects of the stiffening connector 125 described above, the fastener hole 142 can be oriented at the acute angle α (shown in FIG. 2D) relative to the connector body 130.

FIGS. 3B and 3C illustrate a front view and a top perspective view, respectively, of the hanger assembly 100 according to another aspect of the disclosure, wherein the stiffening system 120 comprises a plurality of the stiffening connectors 125 of FIG. 3A. As shown, the hanger assembly 100 can comprise the support rod 104 and the hanger 108. The support rod 104 can extend between the ceiling 102 of the building structure and the hanger 108, and the hanger 108 can support the piping 101. The hanger assembly 100 can further comprise the stiffening system 120. The stiffening system 120 can comprise both of the upper stiffener rod 123 and the lower stiffener rod 124, wherein the upper stiffener rod 123 can abut and extend substantially downward from the ceiling 102, relative to the orientation shown, and the lower stiffener rod 124 can abut and extend substantially upward from one of the piping 101 or the hanger 108, relative to the orientation shown. In the present aspect, in place of the strut 190 (shown in FIG. 1A), the stiffening system 120 can comprise the pipe segment 260 defining the pipe channel 262 (shown in FIG. 2D). Each of the upper and lower stiffener rods 123,124 can be configured to extend into the pipe channel 262 of the pipe segment 260.

Example aspects of the stiffening system 120 can further comprise an upper pipe connector 366 configured to couple the upper stiffener rod 123 to the pipe segment 260 at an upper pipe segment end 362 thereof and a lower pipe connector 368 configured to couple the lower stiffener rod 124 to the pipe segment 260 at a lower pipe segment end 364 thereof. In some aspects, similar to the strut caps 232 of FIG. 2B, each of the upper and lower pipe connectors 366,368 can define internal threading 371 (shown in FIG. 3F) configured to mate with external threading of the upper and lower and stiffener rods 123,124, respectively, and the upper and lower stiffener rods 123,124 can be rotated relative to the upper and lower pipe connectors 366,368 to adjust the depth to which each of the upper and lower stiffener rods 123,124 extends into the pipe channel 262, thereby adjusting the stiffening system 120 between the shortened and lengthened configurations. The upper pipe connector 366, which can be substantially the same as the lower pipe connector 368, is shown and described in further detail with respect to FIG. 3F. In other aspects, the upper and lower pipe connectors 366,368 can allow for slidable adjustment of the corresponding upper and lower stiffener rods 123,124 relative to the pipe segment 260, such that that depth to which each of the upper and lower stiffener rods 123,124 extends into the pipe channel 262 can be adjusted. The upper and lower pipe connectors 366,368 can further serve to retain the upper and lower stiffener rods 123,124 in position relative to the pipe segment 260 once the stiffening system 120 has been adjusted to the lengthened configuration. As such, the length L of the stiffening system 120 can be adjusted to allow for easy installation of the stiffening system 120 with an existing hanger assembly 100, as described above.

Example aspects of the stiffening system 120 can further comprise a pipe engagement fitting 380 coupled to the lower stiffener rod 124 at a lower end 325 thereof. In some aspects, the pipe engagement fitting 380 can be coupled to the lower stiffener rod 124 by a threaded connection; however in other aspects, the pipe engagement fitting 380 can be coupled to the lower stiffener rod 124 by any suitable fastener known in the art. As shown, in the present aspect, the pipe engagement fitting 380 can be substantially Y-shaped and can define a leg 382 and a pair of arms 384 extending from the leg 382. The pair of arms 384 can define a substantially V-shaped recess therebetween. In example aspects, when the stiffening system 120 is in the lengthened configuration, the pipe engagement fitting 380 can abut the piping 101, with the piping 101 generally oriented within the V-shaped recess. The pipe engagement fitting 380 can serve to distribute pressure from the stiffening system 120 against the piping 101, and can also aid in preventing the lower stiffener rod 124 from slipping off of the piping 101. In example aspects, the pipe engagement fitting 380 can be formed from a metal material, such as, for example, iron, and more specifically ductile iron in some aspects. In other aspects, the pipe engagement fitting 380 can be formed from any other suitable material known in the art, including, but not limited to, rubber, plastics, composites, other metals, and the like.

According to example aspects, one or more of the stiffening connectors 125 can be provided for coupling the stiffening system 120 to the support rod 104 to reinforce the hanger assembly 100. As best seen in the top view of FIG. 3D, the pipe segment 260 can be received within the hook recess 140 of each of the stiffening connectors 125. According to example aspects, the generally semicircular contour of the hook recess 140 can be configured to substantially match the generally circular contour of the pipe segment 260. Furthermore, the support rod 104 can be oriented generally at or near the corner region 180, which, in the present aspect, can be defined between the pipe segment 260 and the shank 135 of the stiffening connector 125. A one of the connector fasteners 127 can threadably engage and extend through the fastener hole 142 (shown in FIG. 3A) in each corresponding stiffening connector 125. The connector fastener 127 can be tightened until the first fastener end 165 thereof presses into the support rod 104 into the corner region 180 against the pipe segment 260 and the shank 135 at a desired force. In the present aspect, the size of the support rod 104 and the angle $\alpha$ of the connector fastener 127 can be configured such that the connector fastener 127 can press against the support rod 104 in a substantially radial direction, as described above.

Figure 3D:
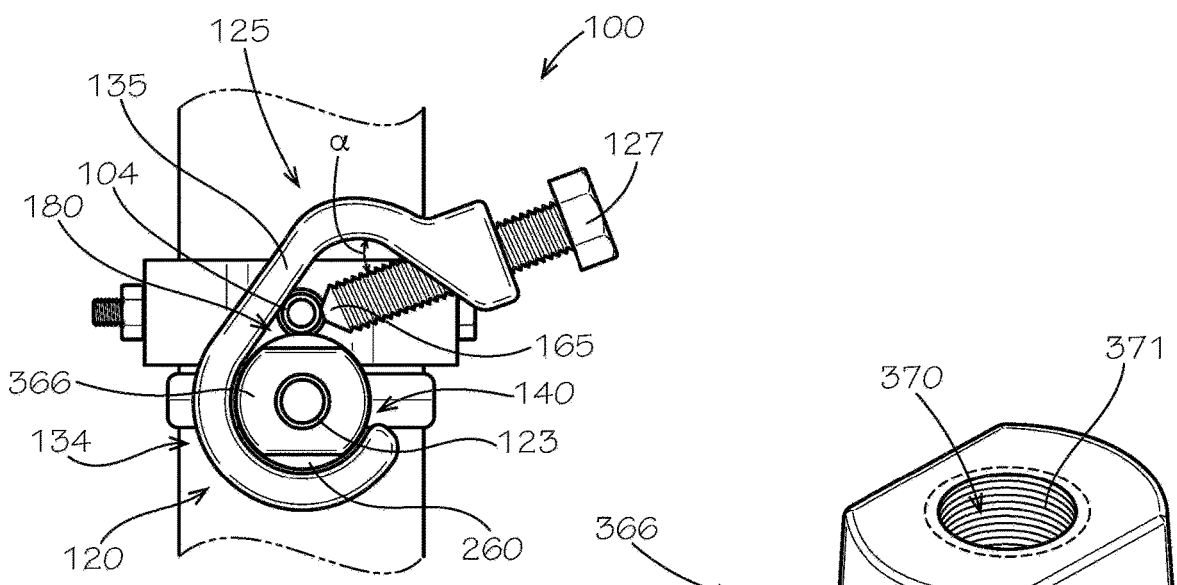
FIG. 3D is a top view of the hanger assembly of FIG. 3B.
Figure 3E:
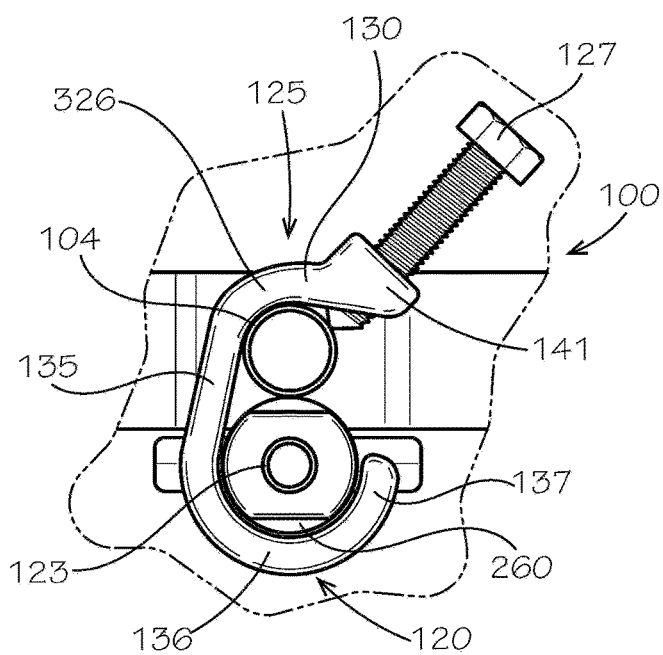
FIG. 3E is a top view of the hanger assembly according to another aspect of the disclosure.

FIG. 3E illustrates an example aspect of the hanger assembly 100 substantially similar to the aspect of FIGS. 3B-3D. However, in the present aspect, the support rod 104 can define a thicker diameter. In aspects wherein the support rod 104 defines a thicker diameter, as shown, the connector fastener 127 can be threaded to a lesser depth through the fastener hole 142 (shown in FIG. 3A). Additionally, in the present aspect, the support rod 104 can be configured to be wedged between the pipe segment 260 and a curved portion 326 of the stiffening connector 125 formed at a junction between the shank 135 and the connector body 130, as shown. In the present aspect, a diameter of the support rod 104 can be larger than a diameter of the support rod 104 of FIG. 3D, and as such, the connector fastener 127 may not press into the support rod 104 in a radial direction.

Figure 3F:
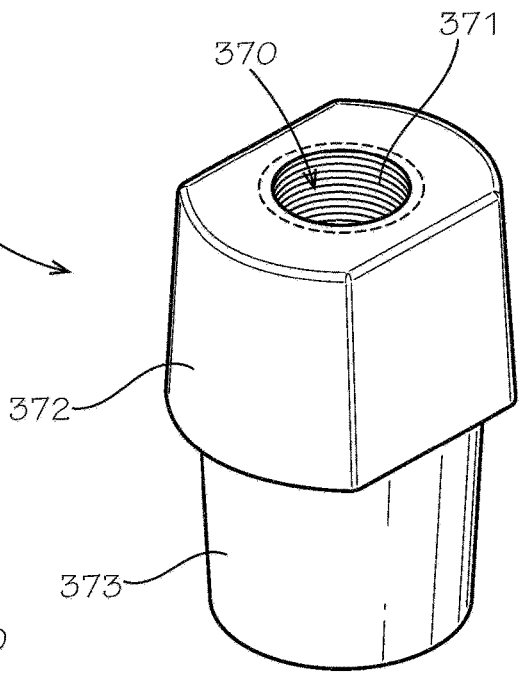
FIG. 3F is a top perspective view of an upper pipe connector of the hanger assembly of FIG. 3B.

FIG. 3F illustrates the upper pipe connector 366, according to an example aspect of the present disclosure, wherein the lower pipe connector 368 (shown in FIG. 3B) can be substantially the same as the upper pipe connector 366. As shown, similar to the strut cap 232 shown in FIG. 2E, the upper pipe connector 366 can define a pipe connector opening 370, through which the upper stiffener rod 123 (shown in FIG. 3B) can extend. In some aspects, the pipe connector opening 370 can define the internal threading 371, as shown, which can be configured to mate with external threading formed on the upper stiffener rod 123. Furthermore, as shown, example aspects of the upper pipe connector 366 can generally define a exterior portion 372, which can be oriented external to the pipe channel 262 (shown in FIG. 2D) of the pipe segment 260 (shown in FIG. 3B), and an interior portion 373, which can be oriented within the pipe channel 262 when the stiffening system 120 (shown in FIG. 3B) is assembled. In the present aspect, a width or diameter of the interior portion 373 can be less than a width or diameter of the exterior portion 372. The exterior portion 373 of the upper pipe connector 366 can be configured to abut the upper pipe segment end 362 (shown in FIG. 3B) of the pipe segment 260, and the increased width or diameter of the exterior portion 372 can prohibit the exterior portion 372 from entering the pipe channel 262. In example aspects, the upper and lower pipe connectors 366,368 can be formed from a metal material, such as, for example, iron, and more specifically ductile iron in some aspects. In other aspects, the upper and lower pipe connectors 366,368 can be formed from any other suitable material known in the art, including, but not limited to, plastics, rubbers, composites, other metals, and the like.

Figure 3G:
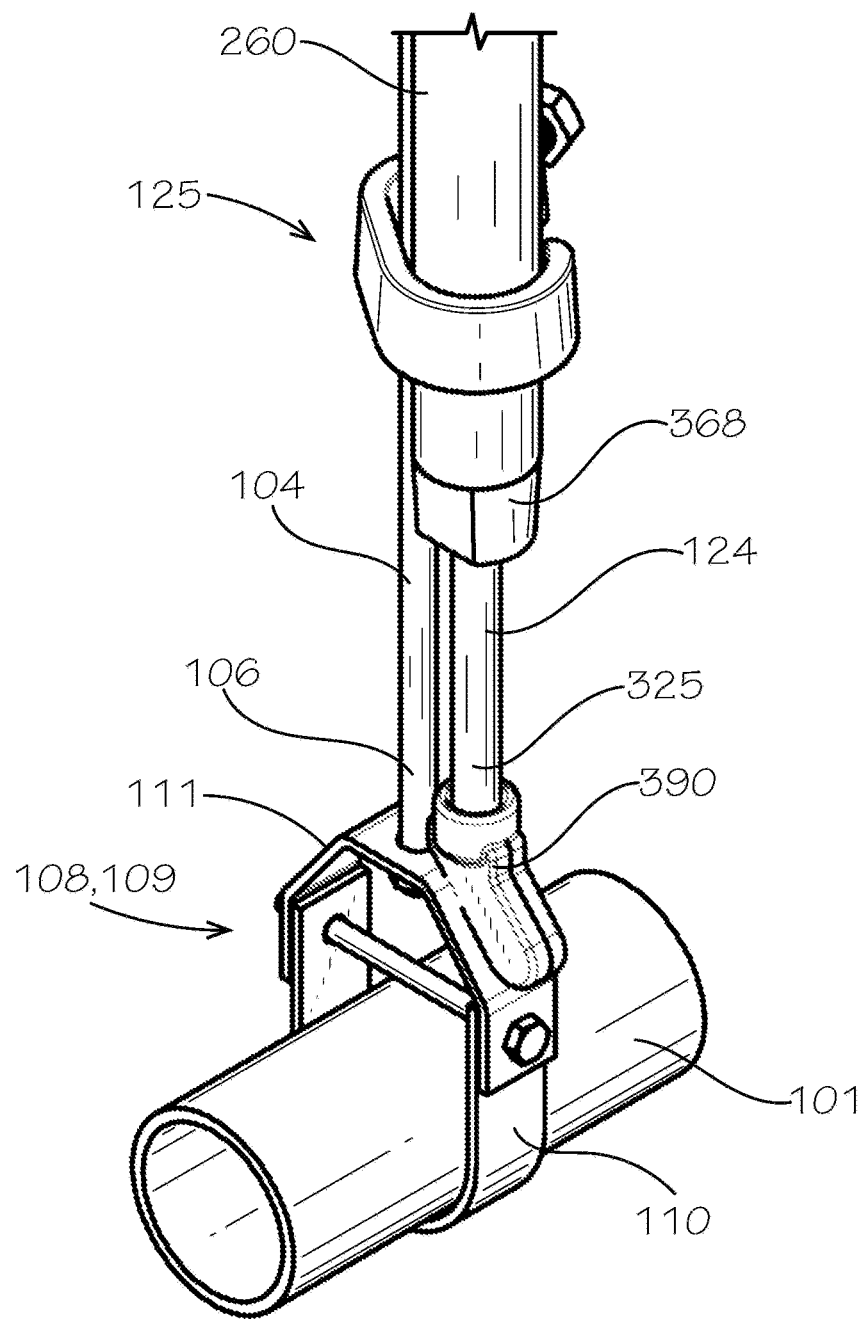
FIG. 3G is a top perspective view of a lower end of the hanger assembly according to another aspect of the disclosure.

FIG. 3G illustrates the hanger assembly 100 according to another example aspect of the present disclosure. The hanger assembly 100 can be substantially similar to the hanger assembly 100 of FIGS. 3B-3D. However, in the present aspect, the hanger assembly 100 does not comprise the pipe engagement fitting 380 (shown in FIG. 3C) coupled to the lower end 325 of the lower stiffener rod 124. Rather, as shown, a hanger engagement fitting 390 can be coupled to the lower stiffener rod 124 at the lower end 325 thereof. The hanger engagement fitting 390 can be configured to abut the upper hanger member 111 of the hanger 108 when the stiffening system 120 (shown in FIG. 3B) is in the lengthened configuration. In some aspects, the hanger engagement fitting 390 can be coupled to the lower stiffener rod 124 by a threaded connection; however in other aspects, the hanger engagement fitting 390 can be coupled to the lower stiffener rod 124 by any suitable fastener known in the art. The hanger engagement fitting 390 can serve to distribute pressure from the stiffening system 120 against the hanger 108 and can also aid in preventing the lower stiffener rod 124 from slipping off of the hanger 108. According to example aspects, the hanger engagement fitting 390 can be formed from a metal material, such as, for example, iron, and more specifically ductile iron in some aspects. In other aspects, the hanger engagement fitting 390 can be formed from any other suitable material known in the art, including, but not limited to, rubber, plastics, composites, other metals, and the like.

Figure 4A:
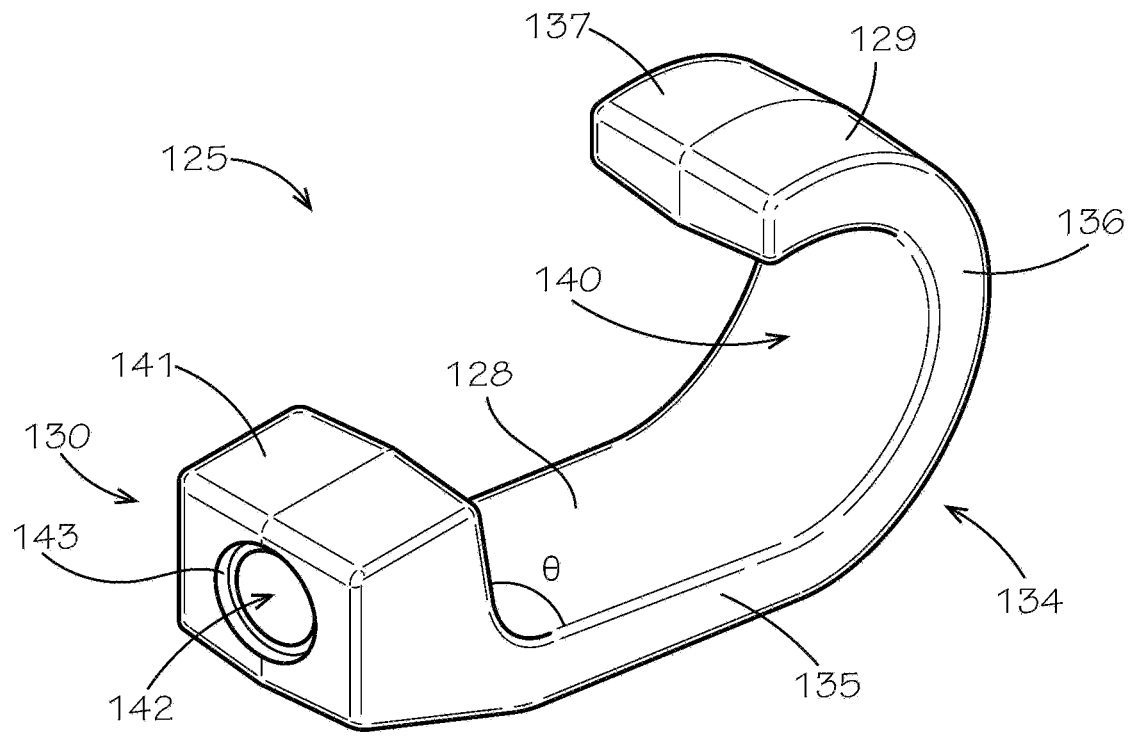
FIG. 4A is a perspective view of the stiffening connector according to another aspect of the present disclosure.

FIG. 4A illustrates the stiffening connector 125 according to another example aspect of the present disclosure, wherein the present stiffening connector 125 is substantially similar to the stiffening connector 125 of FIGS. 3A-3E. As shown, in the present aspect, the stiffening connector 125 can define the inner connector surface 128 and the outer connector surface 129, and can comprise the connector hook 134 and the connector body 130 extending from the connector hook 134. The connector hook 134 can substantially define a J-shape, and can comprise the shank 135, the bend 136, and the finger 137. The connector hook 134 can further define the hook recess 140, which can define a substantially semi-circular cross section in the present aspect. The fastener pad 141 can be the connector body 130 in the present aspect, and can be oriented at an angle θ of about 90° relative to the shank 135, or slightly greater than 90°. Moreover, the fastener hole 142 can be formed through the fastener pad 141 and can extend from the inner connector surface 128 to the outer connector surface 129. However, in the present aspect, the fastener hole 142 can be oriented about perpendicular to the connector body 130, as described in additional detail with reference to FIG. 4B.

Figure 4B:
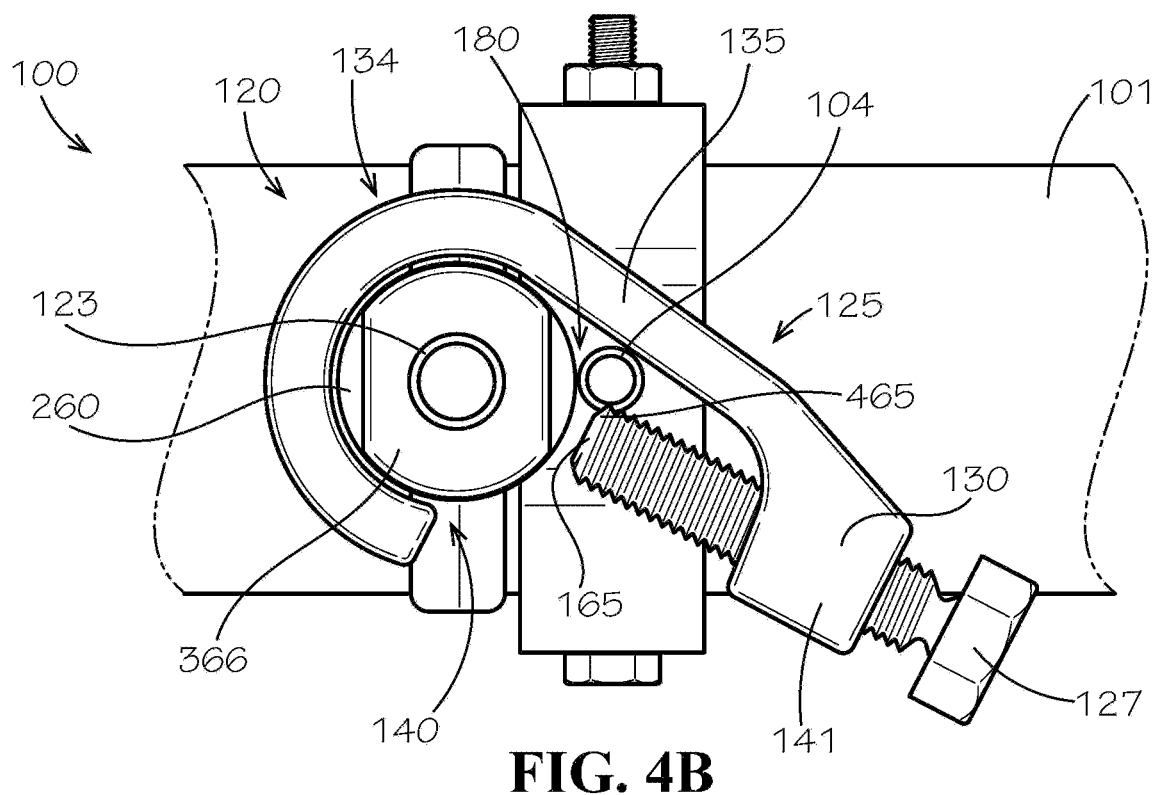
FIG. 4B is a top view of the hanger assembly according to another aspect of the disclosure, comprising the stiffening connector of FIG. 4A.

FIG. 4B illustrates a top view of the hanger assembly 100 according to another aspect of the disclosure, wherein the stiffening system 120 comprises at least one of the stiffening connectors 125 of FIG. 4A. The pipe segment 260 can be received within the hook recess 140 of the stiffening connector(s) 125, and the connector fastener 127 can extend through the fastener hole 142 (shown in FIG. 4A) at a substantially perpendicular orientation relative to the pipe segment 260. In the present aspect, the connector fastener 127 can be a threaded hex bolt defining a substantially flat first fastener end 165, as shown. Moreover, in the present aspect, the support rod 104 can define a relatively small diameter, and the orientation of the connector fastener 127 can be such that an outer edge 465 of the connector fastener 127 at the first fastener end 165 thereof can engage the support rod 104. As shown, the engagement of the connector fastener 127 with the support rod 104 can be nearly tangential, but can supply a sufficient force against the support rod 104 to press the support rod 104 into the corner region 180. In other aspects wherein the diameter of the support rod 104 may be larger, the support rod 104 may be compressed between the connector fastener 127 and the pipe segment 260, instead of being pressed into the corner region 180.

Figure 5A:
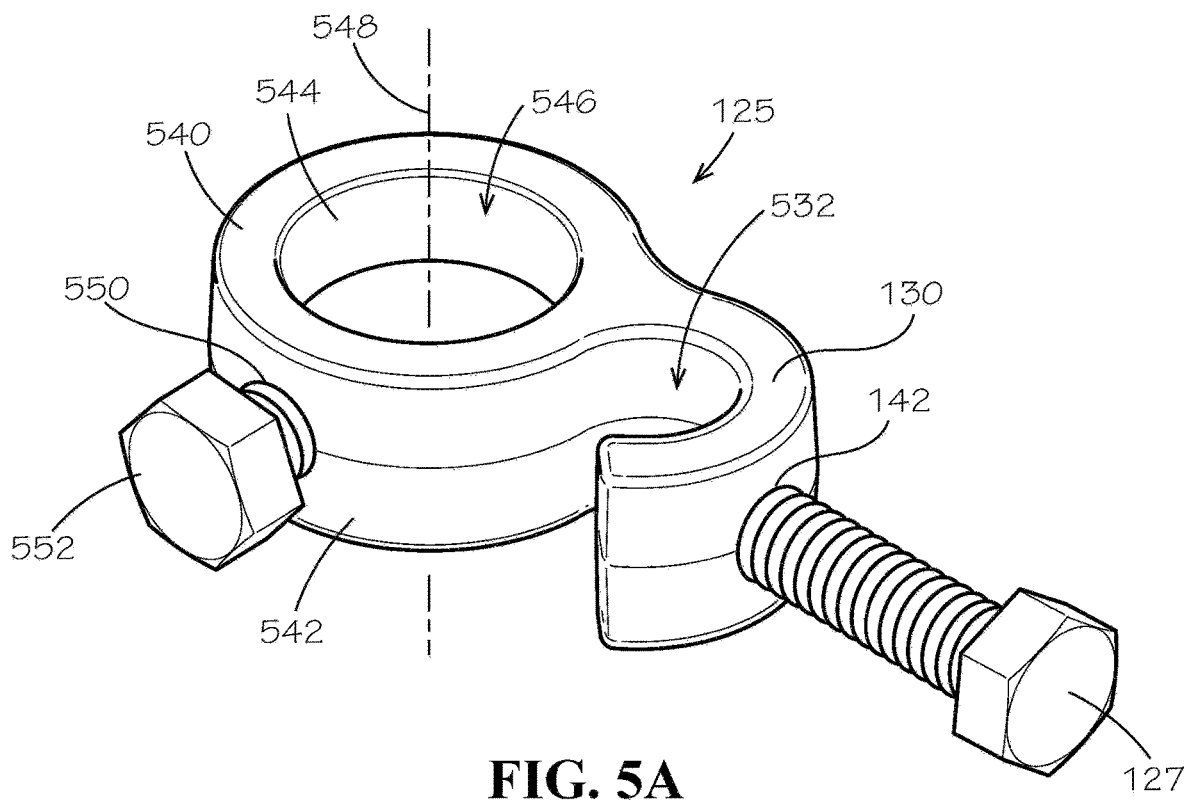
FIG. 5A is a perspective view of the stiffening connector according to another aspect of the present disclosure.

FIG. 5A illustrates the stiffening connector 125 according to another example aspect of the present disclosure. In the present aspect, the stiffening connector 125 can comprise a substantially cylindrical pipe segment receiver 540 and the connector body 130 extending therefrom, wherein the connector body 130 defines an arcuate shape. Example aspects of the pipe segment receiver 540 can define an outer receiver surface 542 and an inner receiver surface 544, and the inner receiver surface 544 can define a substantially cylindrical receiver channel 546. The receiver channel 546 can define a receiver axis 548 extending through a center thereof, as shown. Moreover, the pipe segment receiver 540 can define a receiver hole 550 formed therethrough, extending from the outer receiver surface 542 to the inner receiver surface 544. A receiver fastener 552 can threadably engage the receiver hole 550 in example aspects. The receiver fastener 552 can be for example, a threaded bolt, as shown, a screw, or any other suitable fastener known in the art. According to example aspects, the receiver fastener 552 can be oriented about perpendicular to the receiver axis 548. Example aspects of the arcuate connector body 130 can extend from the cylindrical pipe segment receiver 540 and can substantially define a J-shape or a U-shape, as shown. A connector body recess 532 can be defined between the arcuate connector body 130 and the outer receiver surface 542 of the cylindrical pipe segment receiver 540. The fastener hole 142 can extend through the arcuate connector body 130, and the connector fastener 127 can threadably engage the fastener hole 142. In the present aspect, the fastener hole 142, and thus the connector fastener 127, can be oriented about perpendicular to the receiver axis 548 defined by the receiver channel 546.

Figure 5B:
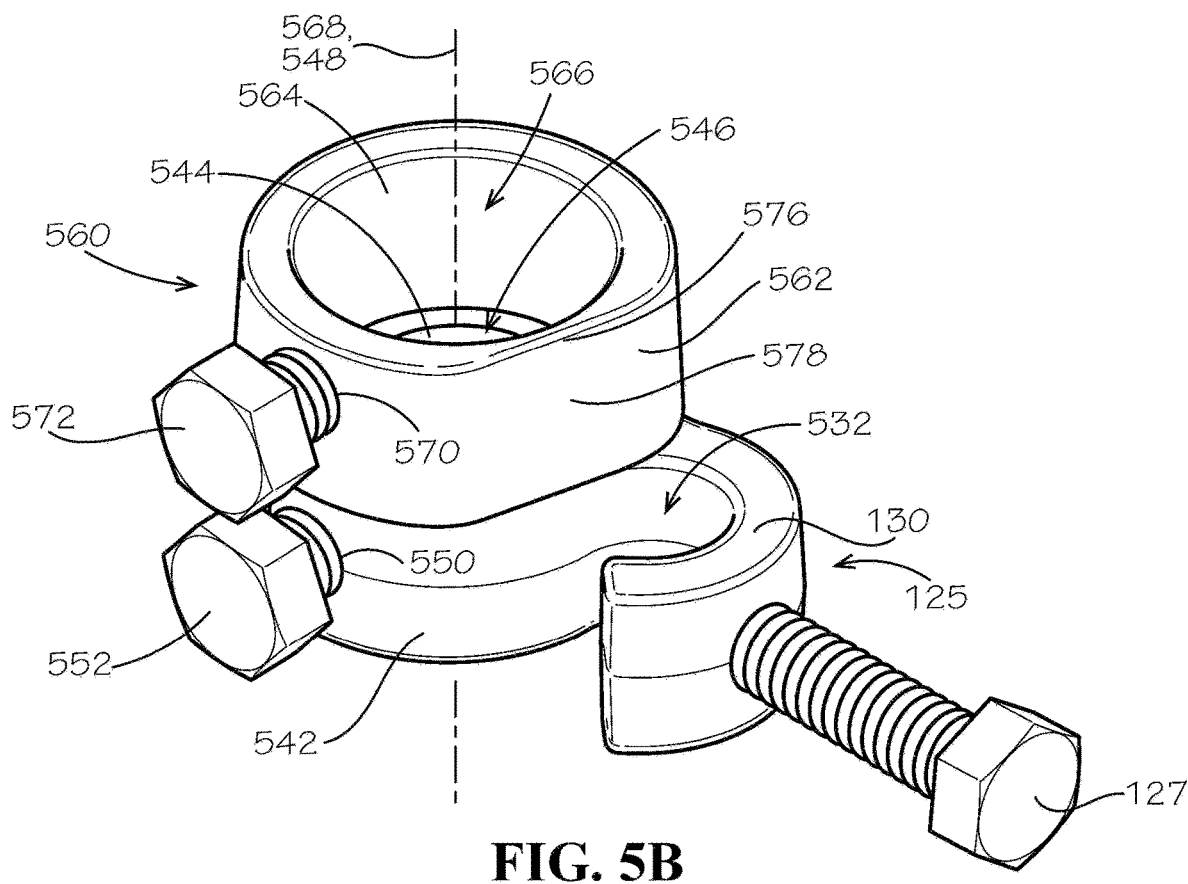
FIG. 5B is a perspective view of the stiffening connector of FIG. 5A and a brace member.

As shown in FIG. 5B, in some example aspects, a telescoping connector 560 can be provided. The telescoping connector 560 is shown in the present aspect sitting atop the stiffening connectors 125 of FIG. 5A. Example aspects of the telescoping connector 560 can define a substantially cylindrical structure. For example, the telescoping connector 560 can define an outer telescoping connector surface 562 and an inner telescoping connector surface 564, wherein the inner telescoping connector surface 564 can define a substantially cylindrical telescoping connector channel 566. The telescoping connector channel 566 can define a telescoping connector axis 568 extending through a center thereof, as shown. In example aspects, the telescoping connector 560 can be aligned with the pipe segment receiver 540 of the stiffening connector 125, such that the telescoping connector channel 566 can be substantially concentric with the receiver channel 546 (i.e., the telescoping connector axis 568 can be substantially aligned with the receiver axis 548).

Example aspects of the telescoping connector 560 can define a telescoping connector hole 570 formed therethrough, extending from the outer telescoping connector surface 562 to the inner telescoping connector surface 564. A telescoping connector fastener 572 can be configured to threadably engage the telescoping connector hole 570, as shown. For example, the telescoping connector fastener 572 can be a threaded bolt, as shown, a screw, or any other suitable fastener known in the art. According to some example aspects, the outer telescoping connector surface 562 can define a substantially planar region 574 at a first side 578 of the telescoping connector 560. In example aspects, the planar region 574 can be configured to generally face in the direction of the arcuate connector body 130 of the stiffening connector 125, as shown in the present FIG. 5B and described in further detail below.

Figure 5C:
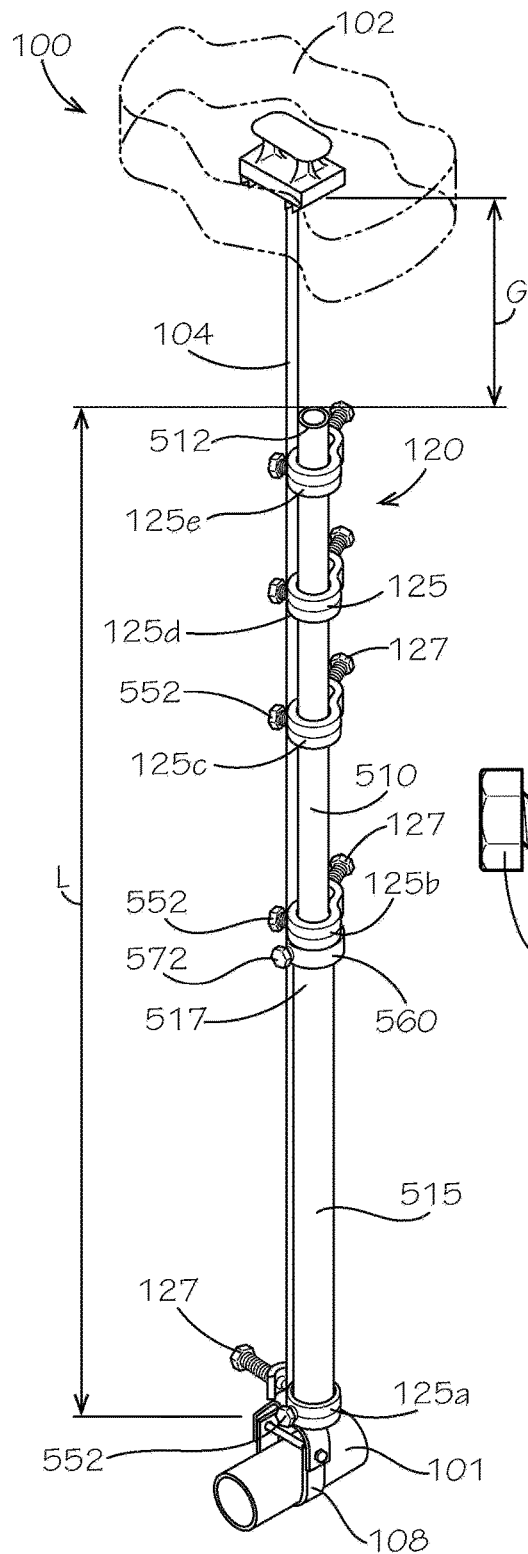
FIG. 5C is a top perspective view illustrating a first step in installing the stiffening system with the hanger assembly, according to another example aspect of the disclosure, wherein the stiffening system comprises the stiffening connector of FIG. 5A and the brace member of FIG. 5B.
Figure 5D:
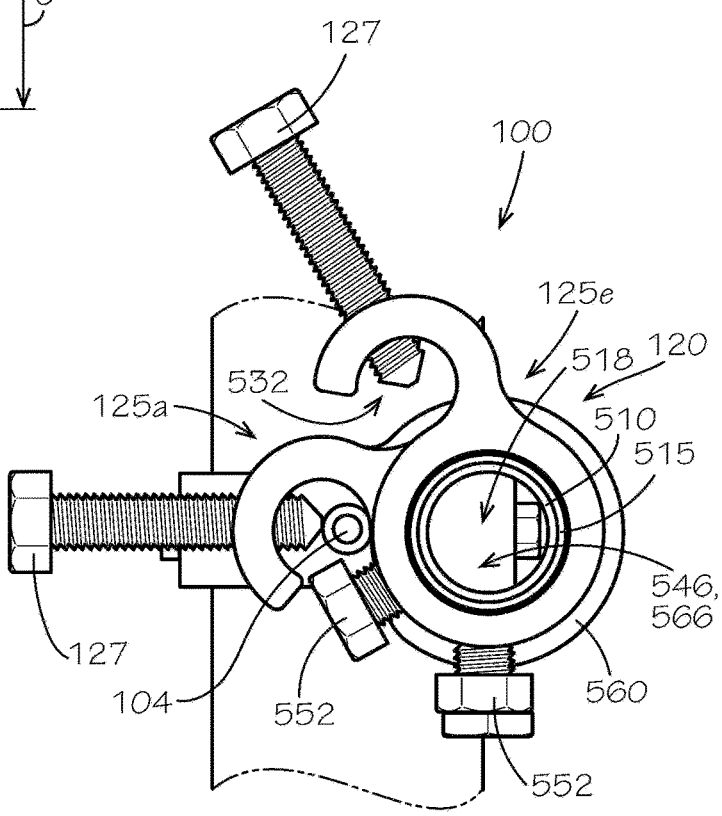
FIG. 5D is a top view of the hanger assembly of FIG. 5C, illustrating the first step in installing the stiffening system of FIG. 5C.

FIGS. 5C and 5D illustrates a top perspective view and a top view, respectively, of a first step in installing the stiffening system 120 with an existing hanger assembly 100, according to another aspect of the present disclosure. The existing hanger assembly 100 can comprise the support rod 104, the hanger 108, and the piping 101. As shown, the stiffening system 120 can comprise a plurality of the stiffening connectors 125 of FIG. 5A and the telescoping connector 560 of FIG. 5B. The stiffening system 120 can further comprise an upper pipe segment 510 and a lower pipe segment 515. A diameter of the upper pipe segment 510 can be smaller than a diameter of the lower pipe segment 515, and the upper pipe segment 510 can slidably engage a lower pipe channel 518 (shown in FIG. 5D) of the lower pipe segment 515, such that the length L of the stiffening system 120 can be selectively adjusted by telescoping the upper pipe segment 510 relative to the lower pipe segment 515. According to example aspects, as shown, the length L of the stiffening system 120 can be shortened to the shortened configuration, (i.e., the upper pipe segment 510 can be slide further into the lower pipe channel 518 of the lower pipe segment 515), as shown, to facilitate installing the stiffening system 120 with the hanger assembly 100. With the stiffening system 120 shortened, a gap G can be defined between an upper end 512 of the upper pipe segment 510 and the ceiling 102, which can allow an installer to easily orient the upper and lower pipe segments 510,515 in parallel with the support rod 104 between the ceiling 102 and the hanger 108. Example aspects of the upper pipe segment 510 can be formed from a metal material, such as steel. In other aspects, the upper pipe segment 510 can be formed from any other suitable material known in the art.

In example aspects, the stiffening system can comprise a plurality of the stiffening connectors 125. For example, in the present aspect, the stiffening system can comprise five stiffening connectors 125a,b,c,d,e, wherein the stiffening connector 125a is a lower one of the stiffening connectors 125, and the stiffening connectors 125b-e are upper ones of the stiffening connectors 125. As shown, the lower stiffening connector 125a can be provided for coupling the lower pipe segment 515 with the support rod 104, proximate to the hanger 108. According to example aspects, the lower pipe segment 515 can be received through the receiver channel 546 (shown in FIG. 5D) of the lower stiffening connector 125a, and the receiver fastener 552 can extend through the receiver hole 550 (shown in FIG. 5A) to engage the lower pipe segment 515, coupling the lower stiffening connector 125a to the lower pipe segment 515. Moreover, the support rod 104 can be received within the connector body recess 532 (shown in FIG. 5A) of the lower stiffening connector 125a, and the connector fastener 127 can extend through the fastener hole 142 (shown in FIG. 5A) to engage the support rod 104. The first fastener end 165 (shown in FIG. 5A) of the connector fastener 127 can press the support rod 104 against the outer receiver surface 542, compressing the support rod 104 between the connector fastener 127 and the pipe segment receiver 540 to couple the lower pipe segment 515 to the support rod 104. The attachment of the lower pipe segment 515 to the support rod 104 with the lower stiffening connector 125 is shown and described in additional detail with respect to FIG. 5G.

In example aspects, as shown, the telescoping connector 560 can be mounted to the lower pipe segment 515 at an upper end 517 thereof, adjacent to where the upper pipe segment 510 engages the lower pipe segment 515. According to example aspects, the planar region 574 of the telescoping connector 530 can face the support rod 104 so that the outer telescoping connector surface 562 does not contact or interfere with the support rod 104. The telescoping connector fastener 572 can extend through the telescoping connector hole 570 (shown in FIG. 5B) and can engage the lower pipe segment 515 to couple the telescoping connector 560 therewith. In the present aspect, the upper stiffening connectors 125b-e can be provided for coupling the upper pipe segment 510 to the support rod 104, wherein the upper pipe segment 510 can extend through the corresponding receiving channels (shown in FIG. 5A) of the upper stiffening connectors 125b-e. The receiver fastener 552 of each of the upper stiffening connectors 125b-e can extend through the corresponding receiver hole 550 to engage the upper pipe segment 510, mounting the upper stiffening connectors 125b-e thereto. According to example aspects, the telescoping connector 560 mounted at the upper end 517 of the lower pipe segment 515 can be configured to prevent the upper stiffening connectors 125b-e from sliding down the upper pipe segment 510 and onto the lower pipe segment 515. The upper stiffening connectors 125b-e can be configured to couple the upper pipe segment 510 with the support rod 104; however, as shown, in the first step of installation, the upper stiffening connectors 125b-e are not yet engaged with the support rod 104, to allow the upper stiffener rod 123 to slide relative to the lower stiffener rod 124.

Referring to FIGS. 5E and 5F, in a second step of assembling the stiffening system 120 with the existing hanger assembly 100, the length L of the stiffening system 120 can be increased (i.e., the upper pipe segment 510 can be telescoped further out of the lower pipe channel 518— shown in FIG. 5F—of the lower pipe segment 515) to the lengthened configuration, such that upper pipe segment 510 can engage the ceiling 102. Together, the upper and lower pipe segments 510,515 can extend from the ceiling 102 to the hanger 108. Once oriented in the lengthened configuration, the upper stiffening connectors 125b-e can oriented such that the support rod 104 can be received within the corresponding connector body recess 532 of each upper stiffening connector 125b-e. In other aspects, the support rod 104 may be received within some or all of the connector body recesses 532 of the upper stiffening connectors 125b-e prior to lengthening the stiffening system 120. The connector fasteners 127 of each of the upper stiffening connector 125b-e can extend through the corresponding fastener holes 142 (shown in FIG. 5A) to engage the support rod 104. The first fastener end 165 of each connector fastener 127 can press the support rod 104 against the outer receiver surface 542 of the corresponding pipe segment receiver 540, compressing the support rod 104 between the connector fastener 127 and the pipe segment receiver 540 to couple the upper pipe segment 510 to the support rod 104. According to example aspects, the position of the upper pipe segment 510 relative to the lower pipe segment 515 can be maintained by the coupling of the upper pipe segment 510 with the support rod 104, and as such, the stiffening assembly can maintained at the set length L, as shown.

Figure 5G:
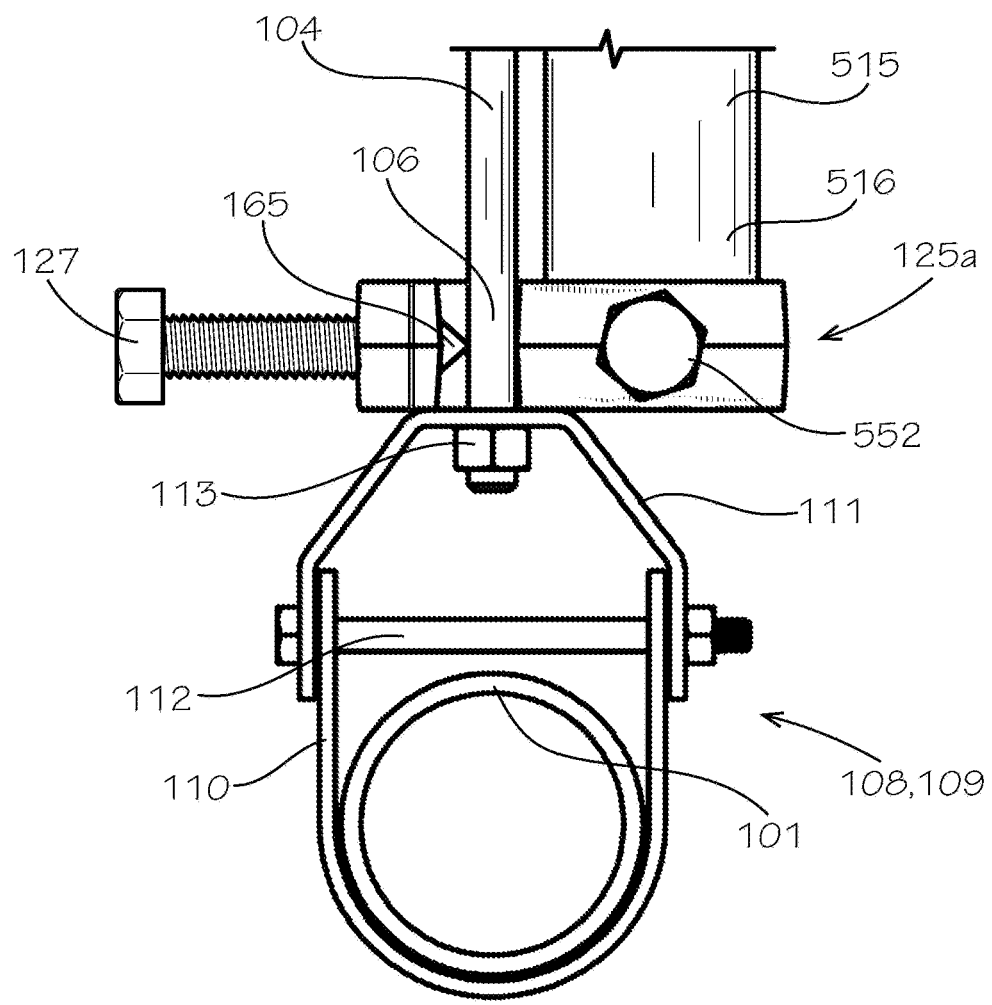
FIG. 5G is a front view of detail 5G taken from FIG. 5E showing the lower end of the hanger assembly of FIG. 5C.

FIG. 5G illustrates a detail view of the attachment of the lower pipe segment 515 to the support rod 104 with the lower stiffening connector 125, taken from Detail 5G in FIG. 5E from a front view. As shown, a lower end 516 of the lower pipe segment 515 can extend through the receiver channel 546 (shown in FIG. 5D) of the lower stiffening connector 125a. The receiver fastener 552 can extend through the receiver hole 550 (shown in FIG. 5A) to engage the lower end 516 of the lower pipe segment 515, coupling the lower stiffening connector 125a to the lower pipe segment 515. Moreover, the lower end 106 of the support rod 104 can extend through the connector body recess 532 (shown in FIG. 5A) of the lower stiffening connector 125a, and the connector fastener 127 can extend through the fastener hole 142 (shown in FIG. 5A) to engage the support rod 104. The first fastener end 165 of the connector fastener 127 can press the support rod 104 against the lower stiffening connector 125a to couple the lower pipe segment 515 to the support rod 104. In example aspects, the lower stiffening connector 125a can be configured to abut the hanger 108. For example, in the present aspect, the lower stiffening connector 125a can be configured to rest atop the upper hanger member 111 of the hanger 108, as shown. Furthermore, the lower end 106 of the support rod 104 can extend through the hanger opening 710 (shown in FIG. 7A), and one of the threaded nuts 113 can be tightened on the support rod 104 to sandwich the upper hanger member 111 between the lower stiffening connector 125a and the nut 113.

Figure 6A:
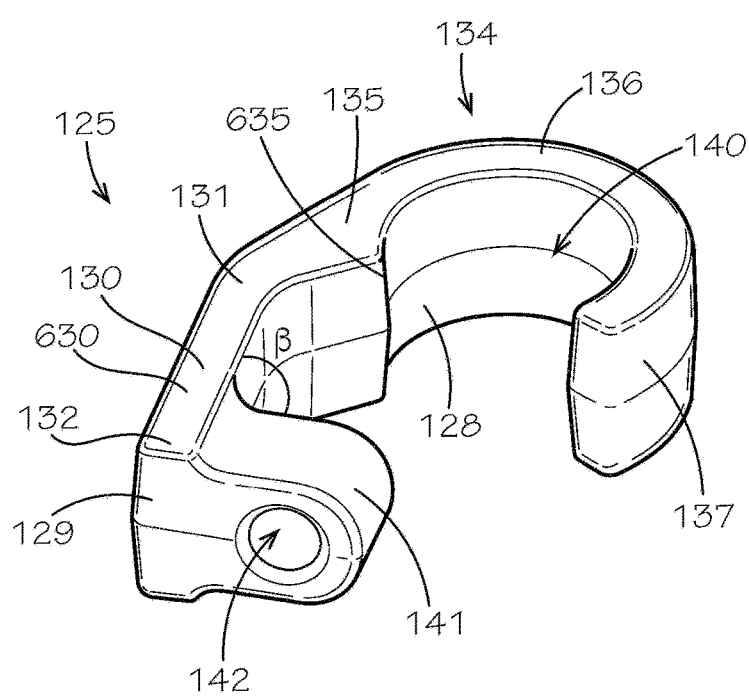
FIG. 6A is a perspective view of the stiffening connector according to another aspect of the present disclosure.

FIG. 6A illustrates the stiffening connector 125 according to another aspect of the present disclosure. As shown, the stiffening connector 125 of the present aspect can define the inner connector surface 128 and the outer connector surface 129. The stiffening connector 125 can also generally define the connector body 130 and the connector hook 134 extending from the first connector body end 131 thereof. In some aspects, the shank 135 can define an inwardly extending shank lip 635, as shown, and the hook recess 140 can be defined by the inner connector surface 128 between the shank lip 635 and the finger end wall 138 of the finger 137. In example aspects, the portion of the inner connector surface 128 defining the hook recess 140 can define a major arc. In other aspects, the hook recess 140 may be bound by a semicircular arc or a minor arc. Moreover, in the present aspect, as shown, the fastener pad 141 can extend from an extension portion 630 of the connector body 130 at the second connector body end 132. The fastener pad 141 can extend from the extension portion 630 at an angle β of about 90°. In other aspects, the angle β can be less than or greater than 90°. The fastener pad 141 can define the fastener hole 142 extending therethrough from the outer connector surface 129 to the inner connector surface 128. In the present aspect, the fastener hole 142 can be oriented about perpendicular to the fastener pad 141 and about parallel with the extension portion 630 of the connector body 130.

Figure 6B:
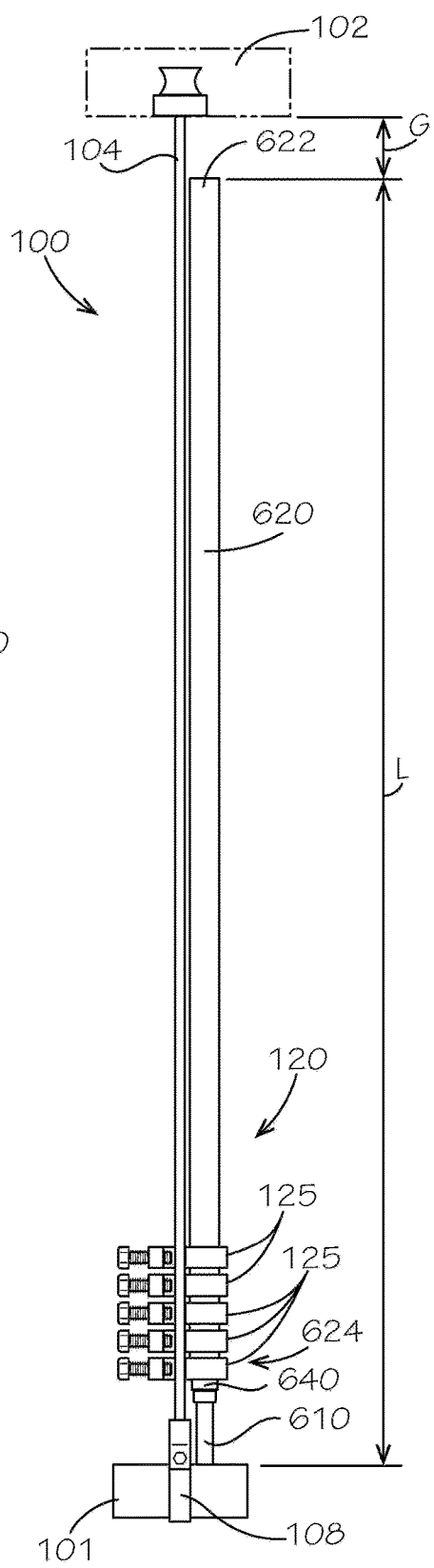
FIG. 6B is a front view illustrating a first step in installing the stiffening system with the hanger assembly, according to another example aspect of the disclosure, wherein the stiffening system comprises the stiffening connector of FIG. 6B.

FIG. 6B illustrates a first step in installing the stiffening system 120 with an existing hanger assembly 100, according to another aspect of the present disclosure. The existing hanger assembly 100 can comprise the support rod 104, the hanger 108, and the piping 101. As shown, the stiffening system 120 can comprise a plurality of the stiffening connectors 125 of FIG. 5A. The stiffening system 120 can further comprise a lower stiffener rod 610 and an upper pipe segment 620, and the stiffening connectors 125 can be mounted to the upper pipe segment 620. For example, the upper pipe segment 620 can extend through the hook recess 140 (shown in FIG. 6A) of each corresponding stiffening connector 125. According to example aspects, a diameter of the lower stiffener rod 610 can be smaller than a diameter of the upper pipe segment 620, and the lower stiffener rod 610 can slidably engage an upper pipe channel 626 (shown in FIG. 6D) of the upper pipe segment 620, such that the length L of the stiffening system 120 can be selectively adjusted by telescoping the lower stiffener rod 610 relative to the upper pipe segment 620. The length L of the stiffening system 120 can be shortened (i.e., the lower stiffener rod 610 can be slide further into the upper pipe channel 626 of the upper pipe segment 620) to facilitate installing the stiffening system 120 with the hanger assembly 100. With the stiffening system 120 shortened as shown, the gap G can be defined between an upper end 622 of the upper pipe segment 620 and the ceiling 102, which can allow an installer to easily orient the lower stiffener rod 610 and upper pipe segment 620 in parallel with the support rod 104 between the ceiling 102 and the hanger 108. In example aspects, a pipe connector 640 can be provided for coupling the upper pipe segment 620 to the lower stiffening rod 610, as shown. For example, the lower stiffening rod 610 can extend through a pipe connector opening (not shown) of the pipe connector 640, and a friction fit can be defined between the lower stiffener rod 610 and the pipe connector 640. In other aspects, the pipe connector opening can define internal threading configured to mate with external threading formed on the lower stiffener rod 610 to couple the pipe connector 640 to the lower stiffener rod 610. The pipe connector 640 can further be configured to engage the upper pipe channel 626 (shown in FIG. 2D) of the upper pipe segment 620 to connect the lower stiffening rod 610 to the upper pipe segment 620. In example aspects, the pipe connector 640 can be configured to slide along the lower stiffening rod 610 when a suitable force is applied thereto in order to adjust the length L of the stiffening system 120. Additionally, the stiffening connectors 125 can be provided to couple the upper pipe segment 620 with the support rod 104; however, as shown, in the first step of installation, the stiffening connectors 125 are not yet engaged with the support rod 104, to allow the lower stiffener rod 610 and upper pipe segment 620 to telescope relative to one another. In some aspects, prior to coupling the upper pipe segment 620 to the support rod 104, the stiffening connectors 125 can be stacked on top of one another at or near a lower end 624 of the upper pipe segment 620. For example, a lowermost one of the stiffening connectors 125 may be configured to rest on the pipe connector 640, as shown.

Figure 6C:
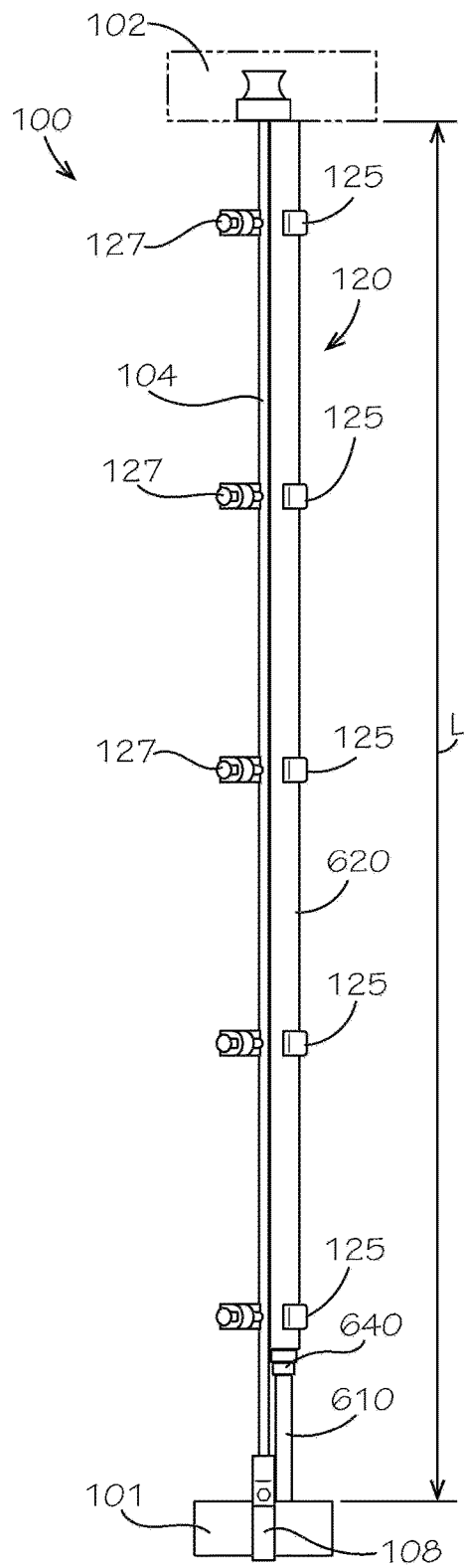
FIG. 6C is a front view illustrating a second step in installing the stiffening system of FIG. 6B with the hanger assembly of FIG. 6B.
Figure 6D:
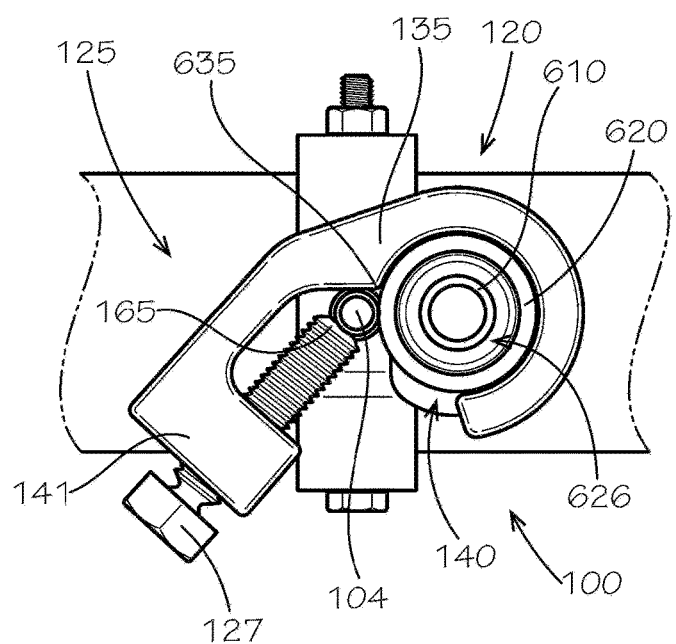
FIG. 6D is a top view of the hanger assembly of FIG. 6B, illustrating the second step in installing the stiffening system of FIG. 6B.
Figure 6E:
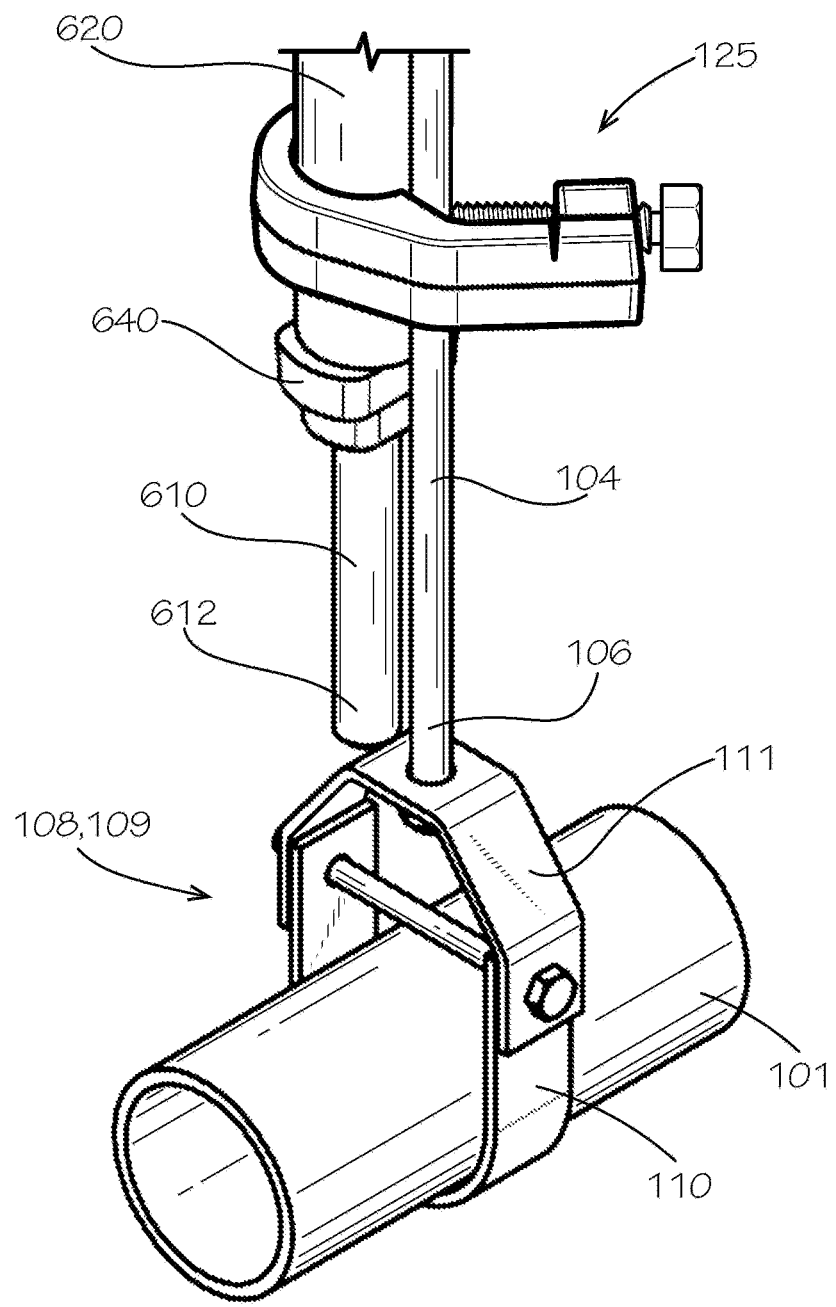
FIG. 6E is a top perspective view of the lower end of the hanger assembly according to another aspect of the disclosure.

FIGS. 6C and 6D illustrate front and top views, respectively, of a second step in assembling the stiffening system 120 with the existing hanger assembly 100. As shown, the length L of the stiffening system 120 can be increased by sliding the upper pipe segment 620 upwards towards the ceiling 102, thus telescoping the lower stiffener rod 610 further out of the upper pipe channel 626 (shown in FIG. 6D). The upper pipe segment 620 can engage the ceiling 102, such that the stiffening assembly can extend from the ceiling 102 to the piping 101. In other aspects, the stiffening system 120 can extend from the ceiling 102 to the hanger 108, as shown in FIG. 6E. Once oriented in the lengthened configuration shown, the stiffening connectors 125 can engage the support rod 104 to couple the upper pipe segment 620 thereto. Referring to FIG. 6D, as shown, the upper pipe segment 620 can extend through the hook recess 140 of each corresponding stiffening connector 125. The connector fastener 127 of each stiffening connector 125 can extend through the corresponding fastener hole 142 (shown in FIG. 6A) to engage the support rod 104. The first fastener end 165 of each connector fastener 127 can press the support rod 104 against the upper pipe segment 620 and the shank 135 of the connector fastener 127 at the shank lip 635, thus coupling the support rod 104 to the upper pipe segment 620 with the connector fasteners 127. According to example aspects, the position of the upper pipe segment 620 relative to the lower stiffener rod 610 can be maintained by the coupling of the upper pipe segment 620 with the support rod 104, and as such, the stiffening system 120 can maintained in the lengthened configuration, as shown in FIG. 6C.

FIG. 6E illustrates the hanger assembly 100 according to another example aspect of the present disclosure. The hanger assembly can be substantially similar to the hanger assembly 100 of FIGS. 6B-6D; however, as shown, a lower end 612 of the lower stiffener rod 610 can be configured to abut the hanger 108 in the lengthened configuration, instead of abutting the piping 101. For example, as shown, the lower end 612 of the lower stiffener rod 610 can abut the upper hanger member 111. In some aspects, the abutment of the lower stiffener rod 610 against the hanger 108 can aid in distributing pressure from the stiffening system 120 (shown in FIG. 6C) against the hanger 108. According to other aspects, the lower end 612 of the lower stiffener rod 610 may not abut either of the hanger 108 and the piping 101.

Figure 7A:
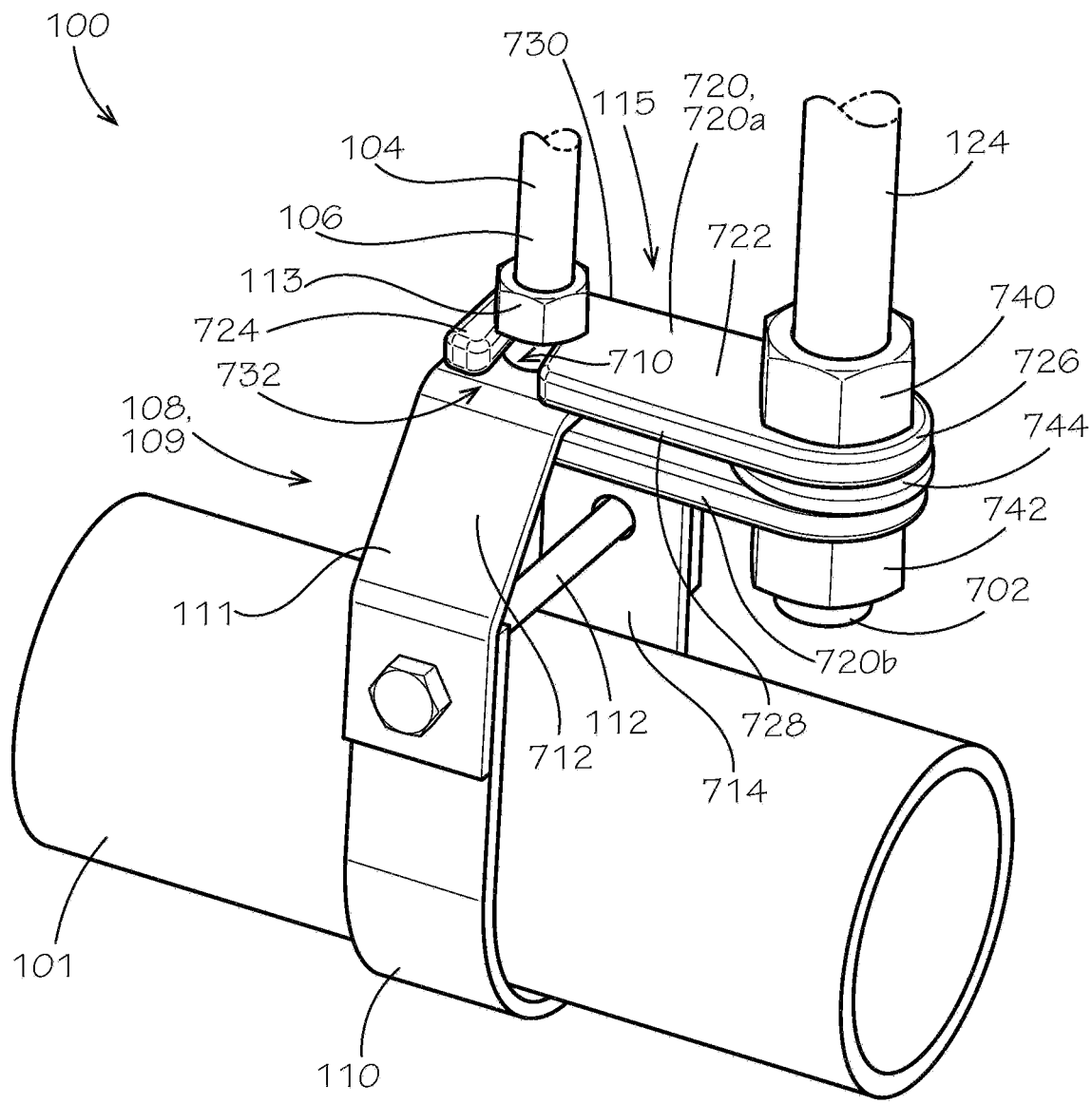
FIG. 7A illustrates a lower end of the hanger assembly of FIG. 1A, wherein the hanger assembly comprising a hanger connection assembly.

FIG. 7A illustrates a lower end of the hanger assembly 100 of FIG. 1A, according to an example aspect of the present disclosure. The hanger assembly 100 can comprise the support rod 104, the hanger 108, and the piping 101. The hanger 108 can be the clevis-type hanger 109 in example aspects. As shown, the hanger 108 can comprise the lower hanger member 110 and the upper hanger member 111 coupled to the lower hanger member 110 by the hanger fastener 112. The hanger opening 710 can be defined through the upper hanger member 111 and the lower end 106 of the support rod 104 can extend therethrough. One or more fasteners, such as the nuts 113, can be provided for securing the support rod 104 to the hanger 108. (In the present view, only an upper one of the nuts 113 is visible; however, a lower one of the nuts 113 can be oriented under the upper hanger member 111 to engage the lower end 106 of the support rod 104 from below the upper hanger member 111, as described in further detail below.) In some aspects, the support rod 104 can define external threading configured to mate with internal threading of the nuts 113 to secure the nuts 113 to the support rod 104.

According to example aspects, the stiffening system 120 (shown in FIG. 1A) can comprise the lower stiffener rod 124, and the lower stiffener rod 124 can be coupled to the upper hanger member 111 of the hanger 108 by the hanger connection assembly 115. Example aspects of the hanger connection assembly 115 can comprise one or more hanger connectors 720. For example, in the present aspect, the hanger connection assembly 115 can comprise an upper hanger connector 720a and a lower hanger connector 720b. Other aspects can comprise more or fewer hanger connectors 720 as desired; for example, in a particular aspect, the hanger connection assembly 115 can comprise a single one of the hanger connectors 720. The upper hanger connector 720a can be configured to engage an upper surface 712 of the upper hanger member 111 proximate to the hanger opening 710 and the lower hanger connector 720b can be configured to engage a lower surface 714 of the upper hanger member 111 proximate to the hanger opening 710.

According to example aspects, the upper and lower hanger connectors 720a,b can be substantially the same. Each of the upper and lower hanger connectors 720a,b can define a first side 724, a second side 726 opposite the first side 724, a front end 728, and a rear end 730 opposite the front end 728. Each of the upper and lower hanger connectors 720a,b can further define a top surface 722 and a bottom surface (not shown) opposite the top surface 722. In example aspects, a hanger connector slot 732 can extend into the front end 728 of each of the upper and lower hanger connectors 720a,b proximate to the first side 724 thereof. The upper hanger member 111 can be received between the upper and lower hanger connectors 720a,b proximate to the first sides 724 of the upper and lower hanger connectors 720a,b, such that each of the hanger connector slots 732 can be substantially aligned with the hanger opening 710, as shown. In some aspects, each hanger connector slot 732 can be substantially parallel with the first and second sides 724,726 of the corresponding upper or lower hanger connector 720a,b. As shown, the support rod can extend through the hanger opening 710 and can be received in the hanger connector slot 732 of each of the upper and lower hanger connectors 720a,b. The upper one of the nuts 113 can engage the top surface 722 of the upper hanger connector 720a, and the lower one of the nuts 113 (not shown) can engage the bottom surface of the lower hanger connector 720b to secure the upper and lower hanger connectors 720a,b to the upper hanger member 111 of the hanger 108.

Moreover, a hanger connector hole 734 (shown in FIG. 7B) can be formed through each of the upper and lower hanger connectors 720a,b proximate to the corresponding second side 726 thereof, and the hanger connector hole 734 can extend from the top surface 722 to the bottom surface. A lower end 702 of the lower stiffener rod 124 can extend through the hanger connector hole 734 of each of the upper and lower hanger connectors 720a,b. In the present aspect, as shown, the lower end 702 of the lower stiffener rod 124 can be positioned such that it does not touch the piping 101 suspended by the hanger 108. In other aspects, however, the lower stiffener rod 124 may touch or otherwise engage the piping 101. As shown, one or more fasteners, such as, for example, an upper nut 740 and a lower nut 742, can be provided for coupling the lower stiffener rod 124 to the hanger connection assembly 115. For example, in some aspects, the lower stiffener rod 124 can define external threading configured to mate with internal threading of the upper and lower nuts 740,742 to secure the upper and lower nuts 740,742 to the lower stiffener rod 124. As shown, the upper nut 740 can be configured to engage the top surface 722 of the upper hanger connector 720a and the lower nut 742 can be configured to engage the bottom surface of the lower hanger connector 720b to sandwich the upper and lower hanger connectors 720a,b between the upper and lower nuts 740,742. Furthermore, a spacer 744 can be mounted to the lower stiffener rod 124 between the upper and lower hanger connectors 720a,b proximate to the corresponding second sides 726 thereof. The spacer 744 can define a thickness about equal to a thickness of the upper hanger member 111 in some aspects. As described above, a portion of the upper hanger member 111 can be received between the upper and lower hanger connectors 720a,b proximate to the corresponding first sides 724 thereof. As such, the first and second hanger connectors 720a,b can be about equally spaced from one another between the first and second sides 724, 726 thereof.

Figure 7B:
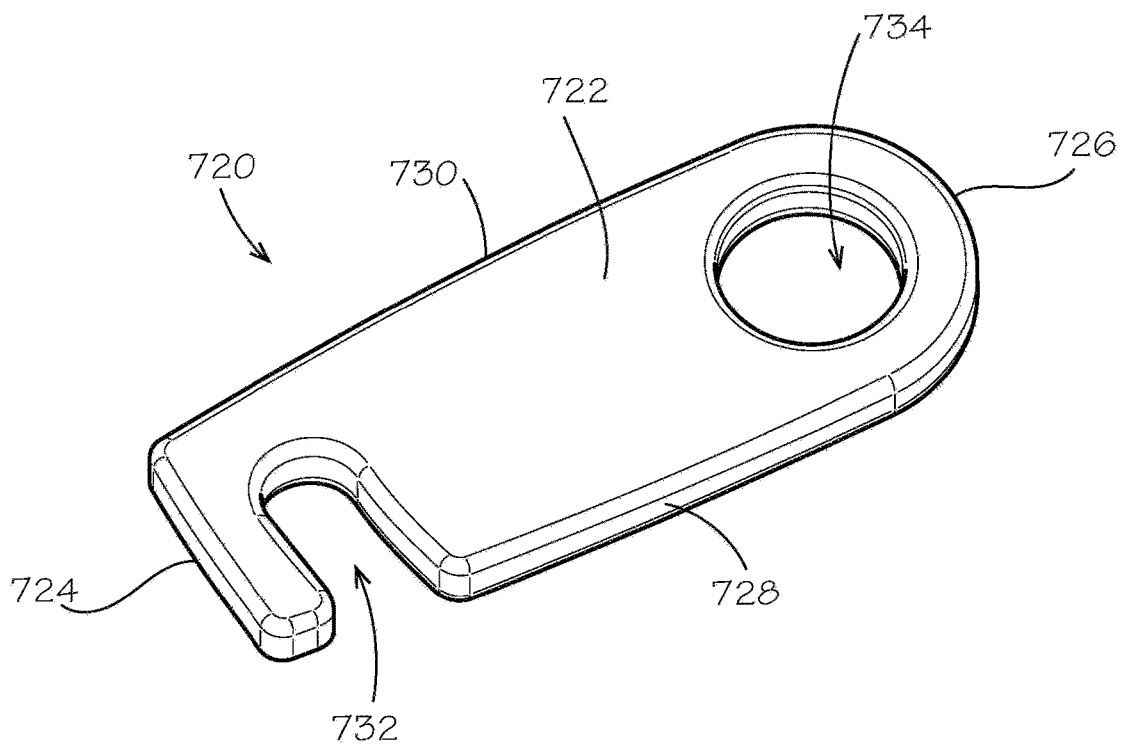
FIG. 7B illustrates a hanger connector of the hanger connection assembly of FIG. 7A.
Figure 8:
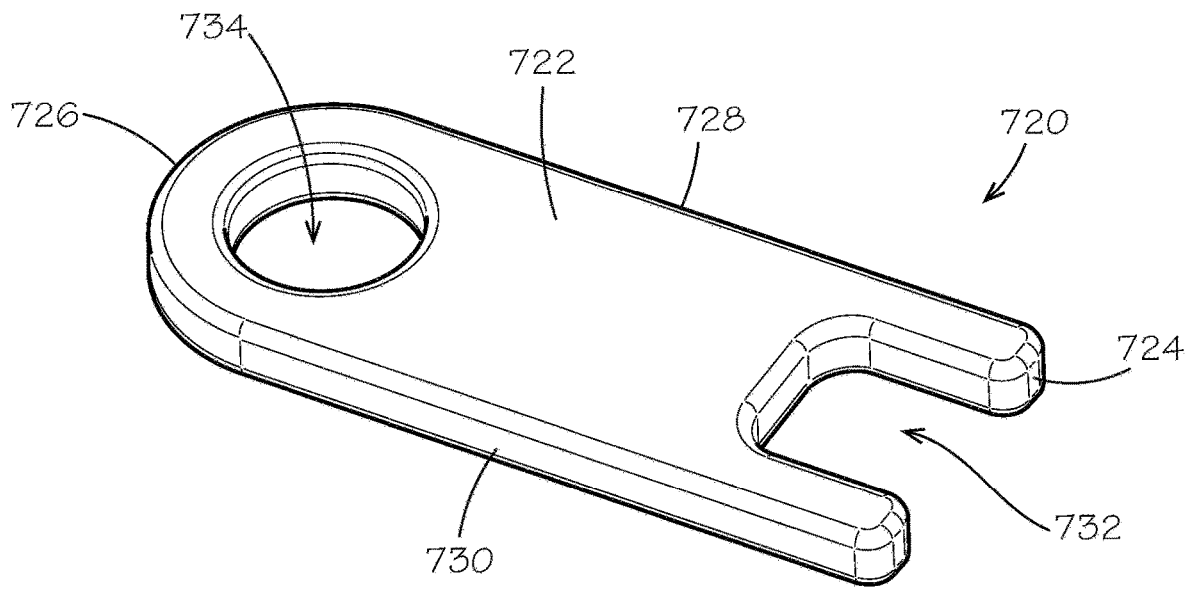
FIG. 8 illustrates the hanger connector according to another aspect of the present disclosure.

FIG. 7B illustrates a one of the hanger connectors 720 of the hanger connection assembly 115 of FIG. 7A. As shown, the hanger connector 720 can define the first side 724, second side 726, front end 728, and rear end 730. The hanger connector 720 can also define the top surface 722 and opposite bottom surface. The hanger connector slot 732 can extend into the front end 728 of proximate to the first side 724 and can span from the top surface 722 to the bottom surface. Furthermore, the hanger connector hole 734 can be formed through the hanger connector 720 proximate to the second side 726 and can span from the top surface 722 to the bottom surface. FIG. 8 illustrates the hanger connector 720 according to another aspect of the present disclosure. The hanger connector 720 of FIG. 8 can be similar to the hanger connector 720 of FIGS. 7A-7B; however, in the present aspect, the hanger connector slot 732 can extend into the first side 724 of the hanger connector 720 instead of the front end 728. According to example aspects, a pair of the present hanger connectors 720 can be provided for coupling the lower stiffener rod 124 (shown in FIG. 7A) to the hanger 108 (shown in FIG. 7A). As described above, the lower stiffener rod 124 can be configured to be received within the hanger connector slots 732 and the lower stiffener rod 124 can be configured to extend through the hanger connector holes 734.

Figure 9:
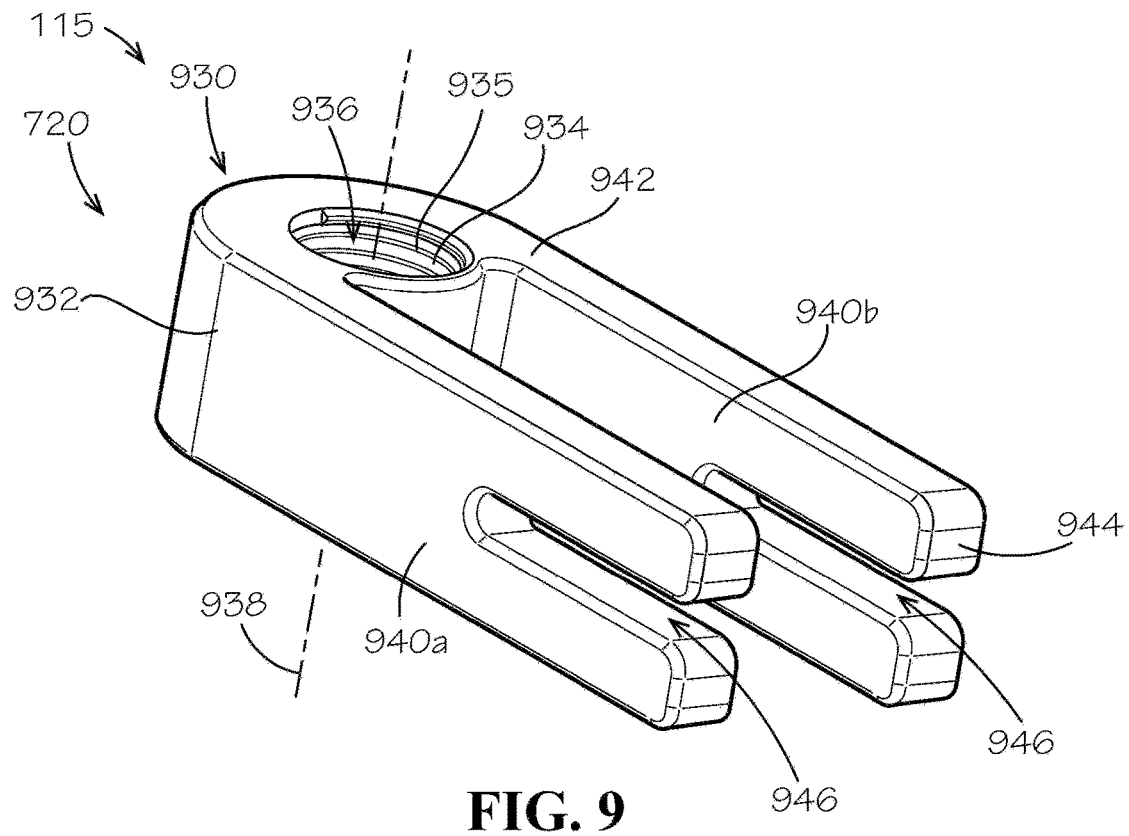
FIG. 9 illustrates the hanger connector according to another aspect of the present disclosure.

FIG. 9 illustrates the hanger connection assembly 115 according to another aspect of the disclosure, wherein the hanger connection assembly 115 can comprise a single one of the hanger connectors 720. In the present aspect, the hanger connector 720 can comprise a cylindrical connector body 930 defining outer surface 932 and an inner surface 934. The inner surface 934 can define a hanger connector channel 936 formed through the connector body 930, and the hanger connector channel 936 can define a hanger connector channel axis 938 through a center thereof. In example aspects, the inner surface 934 can define internal threading 935. As shown, a pair of parallel connector arms 940a,b can extend from the outer surface 932 of the cylindrical connector body 930, and each of the connector arms 940a,b can extend in a direction that can be substantially perpendicular to a direction of hanger connector channel axis 938. Moreover, each of the connector arms 940a,b define a proximal end 942 coupled to the cylindrical connector body 930 and a distal end 944 distal to the connector body 930. As shown, a connector arm slot 946 can be formed in each of connector arms 940a,b. Each connector arm slot 946 can be formed at the distal end 944 of the corresponding connector arm 940a,b and can extend towards the proximal end 942. According to example aspects, the lower stiffener rod 124 (shown in FIG. 7A) can be configured to threadably engage the connector channel 936 to couple the hanger connector 720 to the lower stiffener rod 124. Furthermore, the upper hanger member 111 (shown in FIG. 7A) of the hanger 108 (shown in FIG. 7A) can engage each of the connector arm slots 946 to join the hanger connector 720 with the hanger 108, thereby connecting the lower stiffener rod 124 with the hanger 108.

Figure 10:
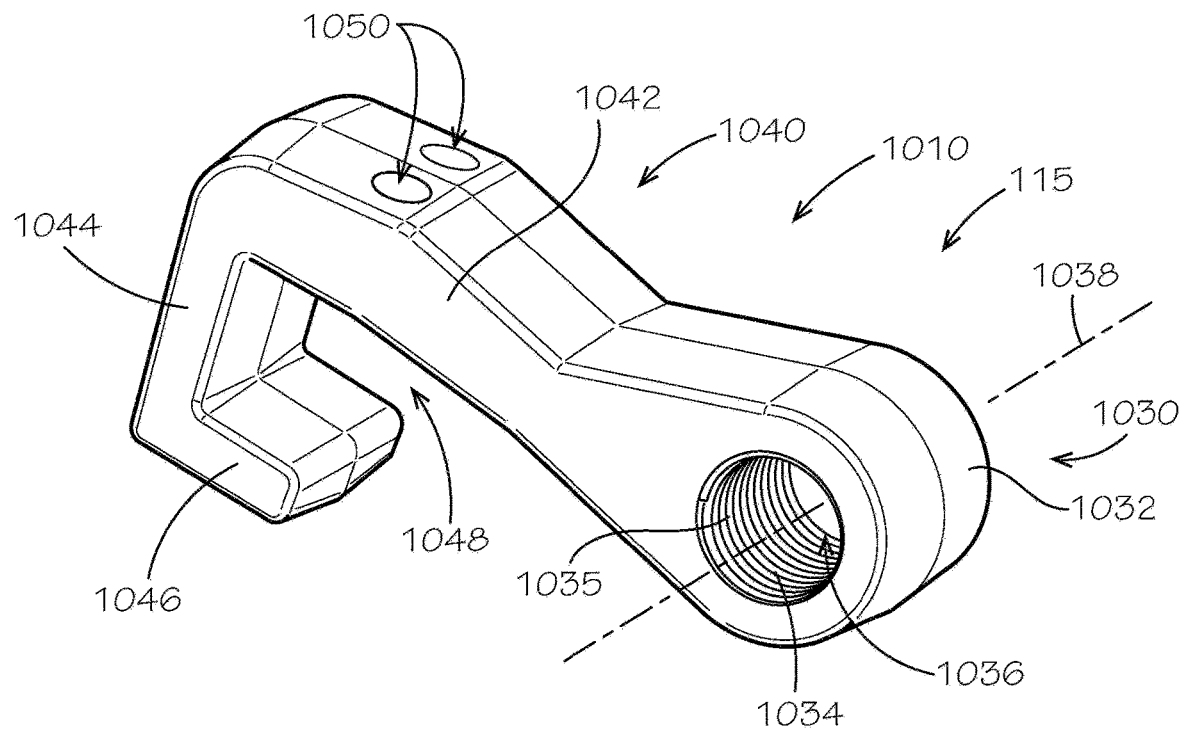
FIG. 10 illustrates a lower connector according to another aspect of the present disclosure.

In some aspects, the lower end 702 of the lower stiffener rod 124 (shown in FIG. 7A) can be connected to the support rod 104 proximate to the hanger 108 (e.g., above or below the upper hanger member 111—shown in FIG. 1A), instead of being connected to the hanger 108. FIG. 10 illustrates an example aspect of a lower connector 1010 for coupling the lower stiffener rod 124 to the support rod 104. As shown, the lower connector 1010 can comprise a lower connector body 1030 defining an outer surface 1032 and an inner surface 1034. The inner surface 1034 can define a lower connector channel 1036 formed through the lower connector body 1030, and the lower connector channel 1036 can define a lower connector channel axis 1038 through a center thereof. In some example aspects, the inner surface 1034 can define internal threading 1035, as shown. Furthermore, example aspects of the lower connector channel 1036 can be a through-channel or a blind channel. In the present aspect, a lower connector hook 1040 can extend from the lower connector body 1030, substantially perpendicular to the lower connector channel axis 1038. The lower connector hook 1040 can generally define a lower shank 1042, a lower bend 1044, and a lower finger 1046. One or more lower fastener holes 1050 can be formed through the lower shank 1042 proximate to the lower bend 1044. The lower connector hook 1040 can further define a lower hook recess 1048, as shown. In example aspects, the lower end 702 of the lower stiffener rod 124 (shown in FIG. 7A) can be threaded and can threadably engage the lower connector channel 1036 to couple the lower connector 1010 to the lower stiffener rod 124. The support rod 104 can be configured to extend through the lower hook recess 1048, and one or more lower fasteners (not shown) can extend through the corresponding one or more lower fastener holes 1050 to engage the support rod 104 and to press the support rod 104 into the connector hook 1040, thereby coupling the lower connector 1010 to the support rod 104. In some aspects, the lower connector 1010 can be oriented above the hanger 108 (shown in FIG. 7A), relative to the orientation shown. For example, in a particular aspect, similar to the upper hanger connector 720a of FIG. 7A, the lower connector hook 1040 of the lower connector 1010 can be configured to engage the upper surface 712 of the upper hanger member 111 proximate to the hanger opening 710 (upper surface 712, upper hanger member 111, and hanger opening 710 shown in FIG. 7A). The upper one of the threaded nuts 113 can be tightened against the lower connector hook 1040 to sandwich the lower connector 1010 between the hanger 108 and the upper nut 113. In other aspects, similar to the lower hanger connector 720b of FIG. 7A, the lower connector 1010 can be oriented below the hanger 108, relative to the orientation shown.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described That which is claimed is:

1. A hanger assembly comprising:
a support rod defining an upper end and a lower end;
a hanger coupled to the support rod at a lower end, the hanger configured to support piping; and
a stiffening system comprising a brace member and a stiffener rod, the stiffening system further comprising a first stiffening connector coupling the brace member to the support rod and a second stiffening connector coupling the stiffener rod to the brace member, wherein the stiffener rod is coupled to the hanger by a hanger connection assembly;
wherein the first stiffening connector defines a connector hook and a fastener hole, the connector hook of the first stiffening connector engages a first portion of the brace member, and a first connector fastener extends through the fastener hole of the first stiffening connector and engages the support rod.

2. The hanger assembly of claim 1, wherein the stiffener rod is a lower stiffener rod, the stiffening system further comprising an upper stiffener rod and a third stiffening connector coupling the upper stiffener rod to the brace member.

3. The hanger assembly of claim 1, wherein the hanger connection assembly comprises a hanger connector, the hanger connector defining a first side and an opposite second side, a hanger connector slot formed proximate to the first side and a hanger connector hole formed proximate to the second side, wherein one of the support rod and the stiffener rod is received in the hanger connector slot, and wherein the other one of the support rod and stiffener rod extends through the hanger connector hole.

4. The hanger assembly of claim 1, wherein:
the first stiffening connector further defines a connector body extending from the connector hook;
the connector body defines a fastener pad;
the fastener hole extends through the fastener pad; and
the fastener hole is oriented at an acute angle relative to the connector body.

5. The hanger assembly of claim 1, wherein:
the second stiffening connector defines a connector hook and a fastener hole;
the connector hook of the second stiffening connector engages a second portion of the brace member; and
a second connector fastener extends through the fastener hole of the second stiffening connector and engages the stiffener rod.

6. The hanger assembly of claim 5, wherein:
the brace member is a strut;
the strut defines a first strut sidewall, a second strut sidewall opposite the first strut sidewall, a strut end wall extending between the first and second strut sidewalls, and an open end opposite the strut end wall;
each of the first strut sidewall and second strut sidewall define a strut lip extending therefrom at the open end of the strut;
the first portion of the brace member is the strut lip of the first strut sidewall; and
the second portion of the brace member is the strut lip of the second strut sidewall.

7. The hanger assembly of claim 6, wherein:
each of the first stiffening connector and second stiffening connector comprises a connector hook;
the first connector fastener presses the support rod into a corner region defined between the first strut sidewall and a shank of the connector hook of the first stiffening connector; and
the second connector fastener presses the stiffener rod into a corner region defined between the second strut sidewall and a shank of the connector hook of the second stiffening connector.

8. The hanger assembly of claim 1, wherein the stiffener rod is movable relative to the brace member between a shortened configuration and a lengthened configuration to adjust a length of the stiffening system.

9. A method of reinforcing a hanger assembly comprising:
providing a stiffening system and a hanger assembly, the hanger assembly comprising a support rod and a hanger, the stiffening system comprising a stiffener rod and a brace member;
positioning the stiffening system adjacent to the support rod in a shortened configuration;
coupling the brace member to the support rod with a first stiffening connector;
moving the stiffener rod relative to the brace member to orient the stiffening system in a lengthened configuration;
coupling the stiffener rod to the brace member in the lengthened configuration with a second stiffening connector; and
coupling the stiffener rod to the hanger with a hanger connection assembly.

10. The method of claim 9, wherein coupling the brace member to the support rod with a first stiffening connector comprises engaging a first portion of the brace member with a connector hook of the first stiffening connector, extending a first connector fastener through a fastener hole of the first stiffening connector, and pressing the first connector fastener against the support rod.

11. The method of claim 9, wherein coupling the stiffener rod to the brace member in the lengthened configuration with a second stiffening connector comprises engaging a second portion of the brace member with a connector hook of the second stiffening connector, extending a second connector fastener through a fastener hole of the second stiffening connector, and pressing the second connector fastener against the stiffener rod.

12. The method of claim 9, wherein coupling the stiffener rod to the hanger with a hanger connection assembly comprises receiving the support rod within a hanger connector slot of a hanger connector of the hanger connection assembly and receiving the stiffener rod through a hanger connector hole of the hanger connector.

13. A hanger assembly comprising:
a support rod defining an upper end and a lower end;
a hanger coupled to the support rod at a lower end, the hanger configured to support piping; and
a stiffening system comprising a brace member and a stiffener rod, the stiffening system further comprising a first stiffening connector coupling the brace member to the support rod and a second stiffening connector coupling the stiffener rod to the brace member, wherein the stiffener rod is coupled to the hanger by a hanger connection assembly;

wherein the hanger connection assembly comprises a hanger connector, the hanger connector defining a first side and an opposite second side, a hanger connector slot formed proximate to the first side and a hanger connector hole formed proximate to the second side, wherein one of the support rod and the stiffener rod is received in the hanger connector slot, and wherein the other one of the support rod and stiffener rod extends through the hanger connector hole.

\* \* \* \* \*